US008762258B2

(12) United States Patent
Hansen

(10) Patent No.: US 8,762,258 B2
(45) Date of Patent: Jun. 24, 2014

(54) SYSTEM AND METHOD FOR MANAGING AND EVALUATING NETWORK COMMODITIES PURCHASING

(71) Applicant: BuyMetrics, Inc., Atlanta, GA (US)

(72) Inventor: Valerie Hansen, Racine, WI (US)

(73) Assignee: BuyMetrics, Inc., Atlanta, GA (US)

( * ) Notice: Subject to any disclaimer, the term of this patent is extended or adjusted under 35 U.S.C. 154(b) by 0 days.

(21) Appl. No.: 13/869,942

(22) Filed: Apr. 24, 2013

(65) Prior Publication Data

US 2013/0254092 A1   Sep. 26, 2013

Related U.S. Application Data

(63) Continuation of application No. 13/597,200, filed on Aug. 28, 2012, now Pat. No. 8,442,888, which is a continuation of application No. 13/475,900, filed on May 18, 2012, now Pat. No. 8,321,317, which is a continuation of application No. 13/118,351, filed on May 27, 2011, now Pat. No. 8,224,729, which is a continuation of application No. 12/952,083, filed on Nov. 22, 2010, now Pat. No. 7,966,240, which is a continuation of application No. 11/394,540, filed on Mar. 31, 2006, now Pat. No. 7,840,462, which is a continuation of application No. 09/607,502, filed on Jun. 28, 2000, now Pat. No. 7,043,457.

(51) Int. Cl.
*G06Q 10/04* (2012.01)

(52) U.S. Cl.
USPC .............. 705/37; 705/7.11; 705/20; 705/26.1

(58) Field of Classification Search
None
See application file for complete search history.

(56) References Cited

U.S. PATENT DOCUMENTS

| 3,933,305 A | 1/1976 | Murphy |
| 4,992,940 A | 2/1991 | Dworkin |

(Continued)

FOREIGN PATENT DOCUMENTS

| JP | 62-139088 A | 6/1987 |
| WO | 96/08783 A1 | 3/1996 |

(Continued)

OTHER PUBLICATIONS

Charles R. Plott and Jared Smith, Instability of equilibria in experimental markets: Upward-sloping demands, externalities, and fad-like incentives, Southern Economic Journal, Jan. 1999, vol. 65, iss. 3.*

(Continued)

*Primary Examiner* — Robert Niquette
(74) *Attorney, Agent, or Firm* — Christensen O'Connor Johnson Kindness PLLC

(57) ABSTRACT

Methods and computer storage media provide for evaluating the market value of items. A product specification data set identifies an item defined by two or more parameters, or items that differ in accordance with at least one parameter. For at least one item, transaction data sets that include previously-exposed transaction data between buyers and sellers are obtained. The transaction data represents market reference price data of a particular period of time. The market reference price data is adapted by applying one or more pre-defined rules, variables, or criteria operably associated with the item, a parameter of the item, and/or the one or more databases, to the market reference price data, transforming the transaction data sets into normalized market price data sets that are used to calculate a market value for the item, and communicate the market value to an output. In additional embodiments, price data sets are received and evaluated.

227 Claims, 13 Drawing Sheets

(56) References Cited

U.S. PATENT DOCUMENTS

| | | | |
|---|---|---|---|
| 5,101,353 A | 3/1992 | Lupien | |
| 5,168,446 A | 12/1992 | Wiseman | |
| 5,297,031 A | 3/1994 | Gutterman | |
| 5,414,621 A | 5/1995 | Hough | |
| 5,715,402 A | 2/1998 | Popolo | |
| 5,732,400 A | 3/1998 | Mandler | |
| 5,758,328 A | 5/1998 | Giovannoli | |
| 5,761,389 A | 6/1998 | Maeda | |
| 5,842,178 A | 11/1998 | Giovannoli | |
| 5,857,174 A | 1/1999 | Dugan | |
| 5,873,069 A | 2/1999 | Reuhl | |
| 5,873,071 A | 2/1999 | Ferstenberg | |
| 5,963,910 A | 10/1999 | Ulwick | |
| 5,987,435 A | 11/1999 | Weiss | |
| 5,991,696 A | 11/1999 | McAndrew | |
| 6,023,683 A | 2/2000 | Johnson | |
| 6,035,287 A | 3/2000 | Stallaert | |
| 6,038,537 A | 3/2000 | Matsuoka | |
| 6,055,516 A | 4/2000 | Johnson | |
| 6,055,518 A | 4/2000 | Franklin | |
| 6,058,379 A | 5/2000 | Odom | |
| 6,061,662 A | 5/2000 | Makivic | |
| 6,076,070 A * | 6/2000 | Stack | 705/20 |
| 6,085,164 A | 7/2000 | Smith | |
| 6,134,548 A | 10/2000 | Gottsman | |
| 6,223,164 B1 | 4/2001 | Seare | |
| 6,260,024 B1 | 7/2001 | Shkedy | |
| 6,282,521 B1 | 8/2001 | Howorka | |
| 6,311,144 B1 | 10/2001 | Abu El Ata | |
| 6,339,775 B1 | 1/2002 | Zamanian | |
| 6,415,263 B1 | 7/2002 | Doss | |
| 6,460,020 B1 | 10/2002 | Pool | |
| 6,505,172 B1 | 1/2003 | Johnson | |
| 6,510,434 B1 | 1/2003 | Anderson | |
| 6,535,880 B1 | 3/2003 | Musgrove | |
| 6,553,346 B1 | 4/2003 | Walker | |
| 6,556,976 B1 | 4/2003 | Callen | |
| 6,564,192 B1 | 5/2003 | Kinney, Jr. | |
| 6,609,098 B1 | 8/2003 | DeMarcken | |
| 6,714,933 B2 | 3/2004 | Musgrove | |
| 6,850,900 B1 | 2/2005 | Hare | |
| 6,856,967 B1 | 2/2005 | Woolston | |
| 6,907,404 B1 | 6/2005 | Li | |
| 6,941,280 B1 | 9/2005 | Gastineau | |
| 6,963,854 B1 * | 11/2005 | Boyd et al. | 705/37 |
| 6,976,006 B1 | 12/2005 | Verma | |
| 7,010,494 B2 | 3/2006 | Etzioni | |
| 7,024,376 B1 | 4/2006 | Yuen | |
| 7,031,901 B2 | 4/2006 | Abu El Ata | |
| 7,043,457 B1 | 5/2006 | Hansen | |
| 7,058,598 B1 | 6/2006 | Chen | |
| 7,072,857 B1 | 7/2006 | Calonge | |
| 7,080,033 B2 | 7/2006 | Wilton | |
| 7,107,226 B1 | 9/2006 | Cassidy | |
| 7,107,230 B1 | 9/2006 | Halbert | |
| 7,124,106 B1 | 10/2006 | Stallaert | |
| 7,133,848 B2 | 11/2006 | Phillips | |
| 7,149,717 B1 * | 12/2006 | Kan | 705/37 |
| 7,165,042 B1 | 1/2007 | Segal | |
| 7,206,756 B1 | 4/2007 | Walsky | |
| 7,225,150 B2 | 5/2007 | Wilton | |
| 7,379,898 B2 | 5/2008 | Tenorio | |
| 7,392,214 B1 | 6/2008 | Fraser | |
| 7,430,531 B1 | 9/2008 | Snyder | |
| 7,447,653 B1 | 11/2008 | Watanabe | |
| 7,509,261 B1 | 3/2009 | McManus | |
| 7,552,095 B2 | 6/2009 | Kalyan | |
| 7,577,582 B1 | 8/2009 | Ojha | |
| 7,577,606 B1 | 8/2009 | Ford | |
| 7,653,583 B1 | 1/2010 | Leeb | |
| 7,660,738 B1 | 2/2010 | Siegel | |
| 7,685,048 B1 | 3/2010 | Hausman | |
| 7,702,615 B1 | 4/2010 | Delurgio | |
| 7,725,358 B1 | 5/2010 | Brown | |
| 7,742,934 B2 | 6/2010 | Offutt, Jr. | |
| 7,765,140 B1 | 7/2010 | Megiddo | |
| 7,769,612 B1 | 8/2010 | Walker | |
| 7,835,970 B1 | 11/2010 | Marchegiani | |
| 7,840,476 B1 | 11/2010 | Zack | |
| 7,958,013 B2 | 6/2011 | Porat | |
| 7,970,713 B1 | 6/2011 | Gorelik | |
| 8,005,684 B1 | 8/2011 | Cheng | |
| 8,150,735 B2 | 4/2012 | Walker | |
| 8,229,831 B2 | 7/2012 | Fraser | |
| 2001/0032116 A1 | 10/2001 | Hyatt | |
| 2001/0032163 A1 | 10/2001 | Fertik | |
| 2001/0032171 A1 * | 10/2001 | Brink et al. | 705/37 |
| 2002/0007324 A1 | 1/2002 | Centner | |
| 2002/0010663 A1 | 1/2002 | Muller | |
| 2002/0019794 A1 | 2/2002 | Katz | |
| 2002/0026403 A1 | 2/2002 | Tambay | |
| 2002/0026630 A1 | 2/2002 | Schmidt | |
| 2002/0069134 A1 | 6/2002 | Solomon | |
| 2002/0111873 A1 | 8/2002 | Ehrlich | |
| 2002/0152135 A1 | 10/2002 | Beeri | |
| 2002/0156685 A1 | 10/2002 | Ehrlich | |
| 2003/0065586 A1 | 4/2003 | Shaftel | |
| 2003/0093343 A1 | 5/2003 | Huttenlocher | |
| 2003/0097328 A1 | 5/2003 | Lundberg | |
| 2003/0233305 A1 | 12/2003 | Solomon | |
| 2004/0015415 A1 * | 1/2004 | Cofino et al. | 705/26 |
| 2005/0010494 A1 | 1/2005 | Mourad | |
| 2005/0021366 A1 * | 1/2005 | Pool et al. | 705/1 |
| 2006/0015413 A1 * | 1/2006 | Giovannoli | 705/26 |
| 2006/0253334 A1 | 11/2006 | Fukasawa | |
| 2007/0250431 A1 | 10/2007 | Olof-Ors | |
| 2008/0071638 A1 | 3/2008 | Wanker | |
| 2008/0077542 A1 | 3/2008 | McElhiney | |
| 2008/0270221 A1 | 10/2008 | Clemens | |
| 2009/0083120 A1 | 3/2009 | Strichman | |
| 2009/0138411 A1 | 5/2009 | O'Callahan | |
| 2010/0023379 A1 | 1/2010 | Rappaport | |
| 2010/0082419 A1 | 4/2010 | Au-Yeung | |
| 2010/0185554 A1 | 7/2010 | Sivasundaram | |

FOREIGN PATENT DOCUMENTS

| | | | | |
|---|---|---|---|---|
| WO | WO96/08783 | * | 3/1996 | G06F 17/60 |
| WO | 97/31322 A1 | | 8/1997 | |
| WO | 00/16232 A1 | | 3/2000 | |
| WO | 01/63521 A2 | | 8/2001 | |

OTHER PUBLICATIONS

Böer, G., and J. Ettlie, "Target Costing Can Boost Your Bottom Line," Strategic Finance 81(1):49-52, Jul. 1999.

Lovelock C.H., and G.S. Yip, "Developing Global Strategies for Service Businesses," California Management Review 38(2):64-86, Winter 1996.

O'Brien, T., "A Day at the Park Costs More Than Ever," Amusement Business 108(25):3-5, Jun. 1996.

Plotkin, D., "Business Rules Everywhere, Part 2," Intelligent Enterprise 2(10):42-48, Jul. 1999.

* cited by examiner

SYSTEM AND METHOD FOR MANAGING AND EVALUATING NETWORK COMMODITIES PURCHASING

FIELD

This invention generally relates to electronic commerce software applications and, more particularly, to a method and system relating to commodities purchasing over a network of distributed computing devices.

BACKGROUND

Commodity items such as lumber, agricultural products, metals, and livestock/meat are usually traded in the open market between a number of buyers and sellers. The sales transactions of most commodity items involve a number of parameters. For instance, in the trade of commodity lumber, a buyer usually orders materials by specifying parameters such as lumber species, grade, size (i.e., 2×4, 2×10, etc.), and length, as well as the "tally" or mix of units of various lengths within the shipment, method of transportation (i.e., rail or truck), shipping terms (i.e., FOB or delivered), and desired date of receipt, with each parameter influencing the value of the commodity purchase. Given the multiple possible combinations of factors, a commodity buyer often finds it difficult to objectively compare similar but unequal offerings among competing vendors.

For example, in a case where a lumber buyer desires to order a railcar load of spruce (SPF) 2×4's of #2 & Better grade, the buyer would query vendors offering matching species and grade carloads seeking the best match for the buyer's need or tally preference at the lowest market price. Lumber carloads are quoted at a price per thousand board feet for all material on the railcar. In a market where the shipping parameters are not identical, it is very difficult for buyers to determine the comparative value of unequal offerings.

Typically, a lumber buyer will find multiple vendors each having different offerings available. For example, a railcar of SPF 2×4's may be quoted at a rate of $300/MBF (thousand board feet) by multiple vendors. Even though the MBF price is equal, one vendor's carload may represent significantly greater marketplace value because it contains the more desirable lengths of 2×4's, such as builder-preferred 16-foot 2×4's. When the offering price varies in addition to the mix of lengths, it becomes increasingly difficult to compare quotes from various vendors. Further, because construction projects often require long lead times, the lumber product may need to be priced now, but not delivered until a time in the future. Alternately, another species of lumber (i.e., southern pine) may represent an acceptable substitute.

Therefore, from the foregoing, there is a need for a method and system that allows buyers to evaluate the price of commodity offerings possessing varying shipping parameters.

SUMMARY

The present disclosure includes computer-implemented methods and computer-readable storage media having executable instructions stored thereon, for evaluating the market value of items.

In at least one embodiment, a computer-implemented method comprises receiving one or more product specification data sets that identify at least one item that is defined by two or more parameters, or a plurality of items that differ in accordance with at least one parameter. For at least one item identified in a received product specification data set, the method further comprises obtaining, from one or more databases, a plurality of transaction data sets comprised of previously exposed transaction data between buyers and sellers, wherein the transaction data represents market reference price data of a particular period of time, and wherein the transaction data sets are responsive to the at least one item identified in the product specification data set; and adapting the market reference price data by applying one or more pre-defined rules, variables, or criteria operably associated with the item, a parameter of the item, and/or the one or more databases, to the market reference price data, whereby the plurality of transaction data sets are transformed into normalized market price data sets. The normalized market price data sets are used to calculate a market value for the at least one item in the product specification data set. The calculated market value for the at least one item in the product specification data set is communicated to at least one output. In another embodiment, a non-transitory computer-readable storage medium has computer-executable instructions stored thereon. In response to execution by one or more computing devices, the instructions cause the one or more computing devices to perform the method described above.

In another embodiment, a computer-implemented method comprises receiving one or more price data sets, wherein each price data set specifies at least one item that is defined by two or more parameters, or a plurality of items that vary in accordance with at least one parameter, and price data corresponding to the at least one item in the price data set. For at least one item identified in a received price data set, the method further comprises obtaining from one or more databases, a plurality of transaction data sets comprised of previously exposed transaction data between buyers and sellers, wherein the transaction data represents market reference price data of a particular period of time, and wherein the transaction data sets are responsive to the at least one item identified in the price data set; and adapting the market reference price data by applying one or more pre-defined rules, variables, or criteria operably associated with the item, a parameter of the item, and/or the one or more databases, to the market reference price data, whereby the plurality of transaction data sets are transformed into normalized market price data sets. Using the normalized market price data sets, a market value for the at least one item in the price data set is calculated and communicated to at least one output. In another embodiment, a non-transitory computer-readable storage medium has computer-executable instructions stored thereon. In response to execution by one or more computing devices, the instructions cause the one or more computing devices to perform the method described above.

In yet another embodiment, a computer-implemented method for evaluating price data comprises receiving one or more product specification data sets that identify at least one item that is defined by two or more parameters, or a plurality of items that differ in accordance with at least one parameter, and receiving one or more price data sets, wherein each price data set identifies one or more items and corresponding price data that are responsive to one or more of the items in the product specification data sets. For at least one item identified in a received product specification data set and at least one item identified in a received price data set that is responsive to the at least one item in the product specification data set, the method further comprises obtaining from one or more databases, a plurality of transaction data sets comprised of previously exposed transaction data between buyers and sellers, wherein the transaction data represents market reference price data of a particular period of time, and wherein the transaction data sets are responsive to the at least one item in the product specification data set and the at least one item in the price data set; and adapting the market reference price data by applying one or more pre-defined rules, variables, or criteria operably associated with the item, a parameter of the item, and/or the one or more databases, to the market reference price data, whereby the plurality of transaction data sets are transformed into normalized market price data sets.

Using the normalized market price data sets, a market value is calculated for the at least one item in the product specification data set and/or a market value is calculated for the at least one item in the price data set. A comparison is made of the calculated market value of: the at least one item in the product specification data set with the calculated market value of the at least one item in the price data set; or the at least one item in the product specification data set with the corresponding price data of the at least one item in the price data set; or the at least one item in the price data set with the corresponding price data of the at least one item in the price data set. The comparison is communicated to at least one output.

In still another embodiment, a non-transitory computer-readable storage medium has computer-executable instructions stored thereon that, in response to execution by one or more computing devices, cause the one or more computing devices to perform the method described above.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 8A-8D are images of windows produced by a Web browser application installed on a client computer accessing a server illustrating one embodiment of the present invention.

DETAILED DESCRIPTION

Figure 1:
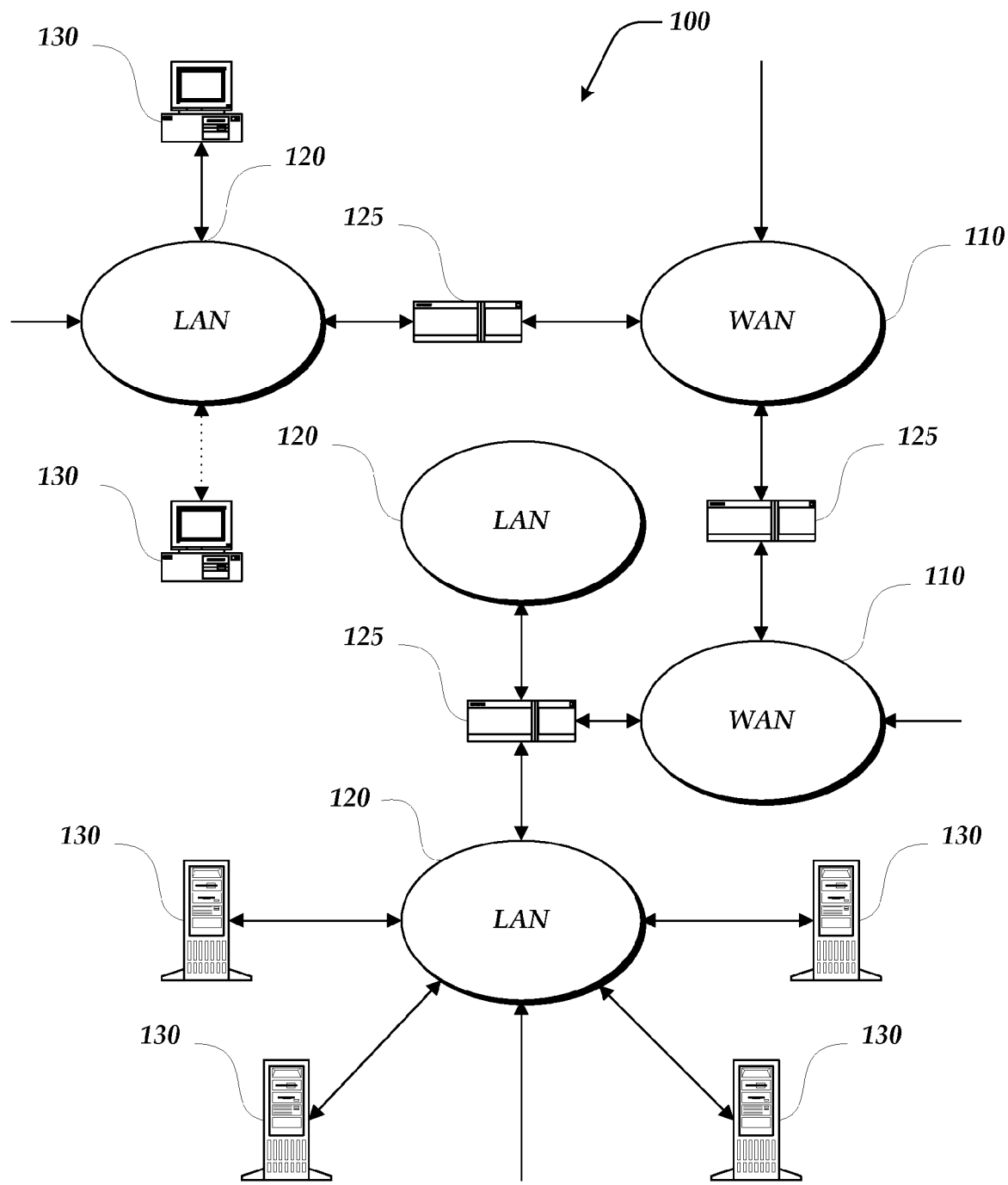
FIG. 1 is a block diagram of a prior art representative portion of the Internet.

The term "Internet" refers to the collection of networks and routers that use the Internet Protocol (IP) to communicate with one another. A representative section of the Internet 100 as known in the prior art is shown in FIG. 1 in which a plurality of local area networks (LANs) 120 and a wide area network (WAN) 110 are interconnected by routers 125. The routers 125 are generally special-purpose computers used to interface one LAN or WAN to another. Communication links within the LANs may be twisted wire pair, or coaxial cable, while communication links between networks may utilize 56 Kbps analog telephone lines, or 1 Mbps digital T-1 lines, and/or 45 Mbps T-3 lines. Further, computers and other related electronic devices can be remotely connected to either the LANs 120 or the WAN 110 via a modem and temporary telephone link. Such computers and electronic devices 130 are shown in FIG. 1 as connected to one of the LANs 120 via dotted lines. It will be appreciated that the Internet comprises a vast number of such interconnected networks, computers, and routers and that only a small representative section of the Internet 100 is shown in FIG. 1.

Figure 2:
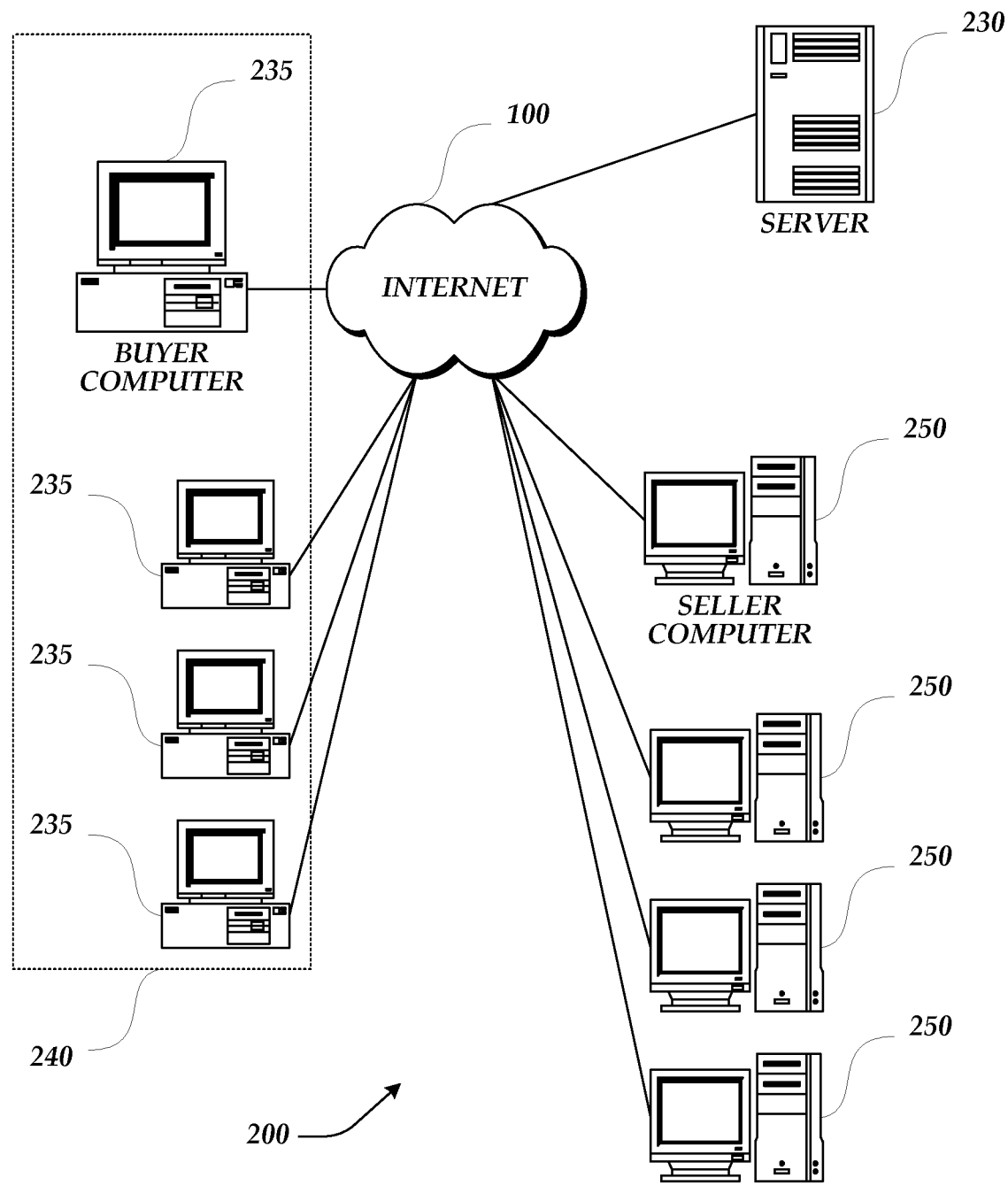
FIG. 2 is a pictorial diagram of a system of devices connected to the Internet, which depict the travel route of data.

The World Wide Web (WWW), on the other hand, is a vast collection of interconnected, electronically stored information located on servers connected throughout the Internet 100. Many companies are now providing services and access to their content over the Internet 100 using the WWW. In accordance with the present invention, and as shown in FIG. 2, there may be a plurality of buyers operating a plurality of client computing devices 235. FIG. 2 generally shows a system 200 of computers and devices to which an information server 230 is connected and to which the buyers' computers 235 are also connected. Also connected to the Internet 100 is a plurality of computing devices 250 associated with a plurality of sellers. The system 200 also includes a communications program, referred to as CEA, which is used on the sellers' computing devices 250 to create a communication means between the sellers' backend office software and the server application.

The buyers of a market commodity may, through their computers 235, request information about a plurality of items or order over the Internet 100 via a Web browser installed on the buyers' computers. Responsive to such requests, the information server 230, also referred to as a server 230, may combine the first buyer's information with information from other buyers on other computing devices 235. The server 230 then transmits the combined buyer data to the respective computing devices 250 associated with the plurality of buyers. Details of this process are described in more detail below in association with FIGS. 5-7.

Those of ordinary skill in the art will appreciate that in other embodiments of the present invention, the capabilities of the server 230 and/or the client computing devices 235 and 250 may all be embodied in the other configurations. Consequently, it would be appreciated that in these embodiments, the server 230 could be located on any computing device associated with the buyer's or seller's computing devices. Additionally, those of ordinary skill in the art will recognize that while only four buyer computing devices 235, four seller computing devices 250, and one server 230 are depicted in FIG. 2, numerous configurations involving a vast number of buyer and seller computing devices and a plurality of servers 230, equipped with the hardware and software components described below, may be connected to the Internet 100.

Figure 3:
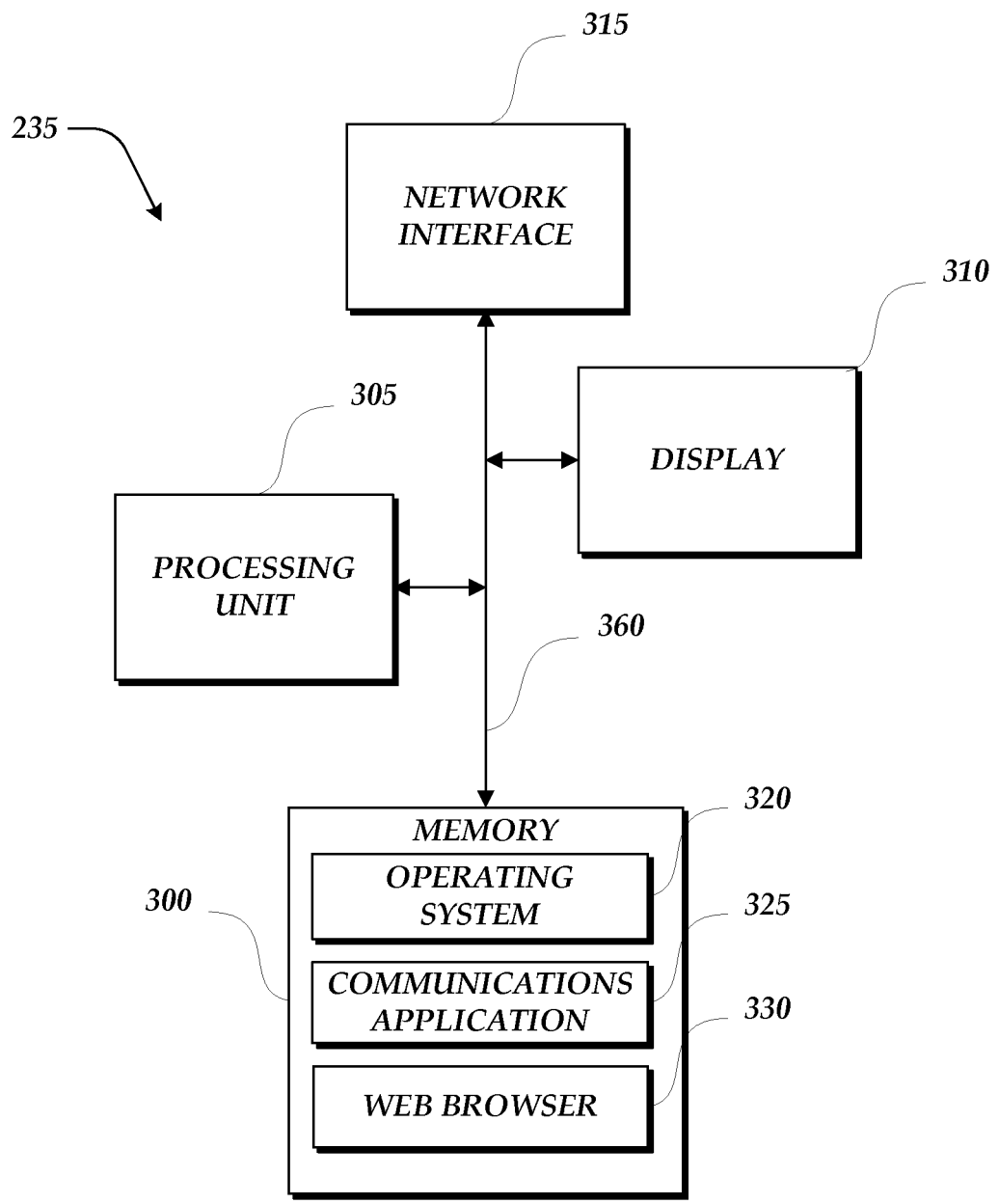
FIG. 3 is a block diagram of the several components of the buyer's computer shown in FIG. 2 that is used to request information on a particular.

FIG. 3 depicts several of the key components of the buyer's client computing device 235. As known in the art, client computing devices 235 are also referred to as "clients" or "devices," and client computing devices 235 also include other devices such as palm computing devices, cellular telephones, or other like forms of electronics. A client computing device can also be the same computing device as the server 230. An "agent" can be a person, server, or a client computing device 235 having software configured to assist the buyer in making purchasing decisions based on one or more buyer-determined parameters. Those of ordinary skill in the art will appreciate that the buyer's computer 235 in actual practice will include many more components than those shown in FIG. 3. However, it is not necessary that all of these generally conventional components be shown in order to disclose an illustrative embodiment for practicing the present invention. As shown in FIG. 3, the buyer's computer includes a network interface 315 for connecting to the Internet 100. Those of ordinary skill in the art will appreciate that the network interface 315 includes the necessary circuitry for such a connection, and is also constructed for use with the TCP/IP protocol.

The buyer's computer 235 also includes a processing unit 305, a display 310, and a memory 300, all interconnected along with the network interface 315 via a bus 360. The memory 300 generally comprises a random access memory (RAM), a read-only memory (ROM), and a permanent mass storage device, such as a disk drive. The memory 300 stores the program code necessary for requesting and/or depicting a desired route over the Internet 100 in accordance with the present invention. More specifically, the memory 300 stores a Web browser 330, such as Netscape's NAVIGATOR® or Microsoft's INTERNET EXPLORER® browsers, used in accordance with the present invention for depicting a desired route over the Internet 100. In addition, memory 300 also stores an operating system 320 and a communications application 325. It will be appreciated that these software components may be stored on a computer-readable medium and loaded into memory 300 of the buyer's computer 235 using a drive mechanism associated with the computer-readable medium, such as a floppy, tape, or CD-ROM drive.

Figure 4:
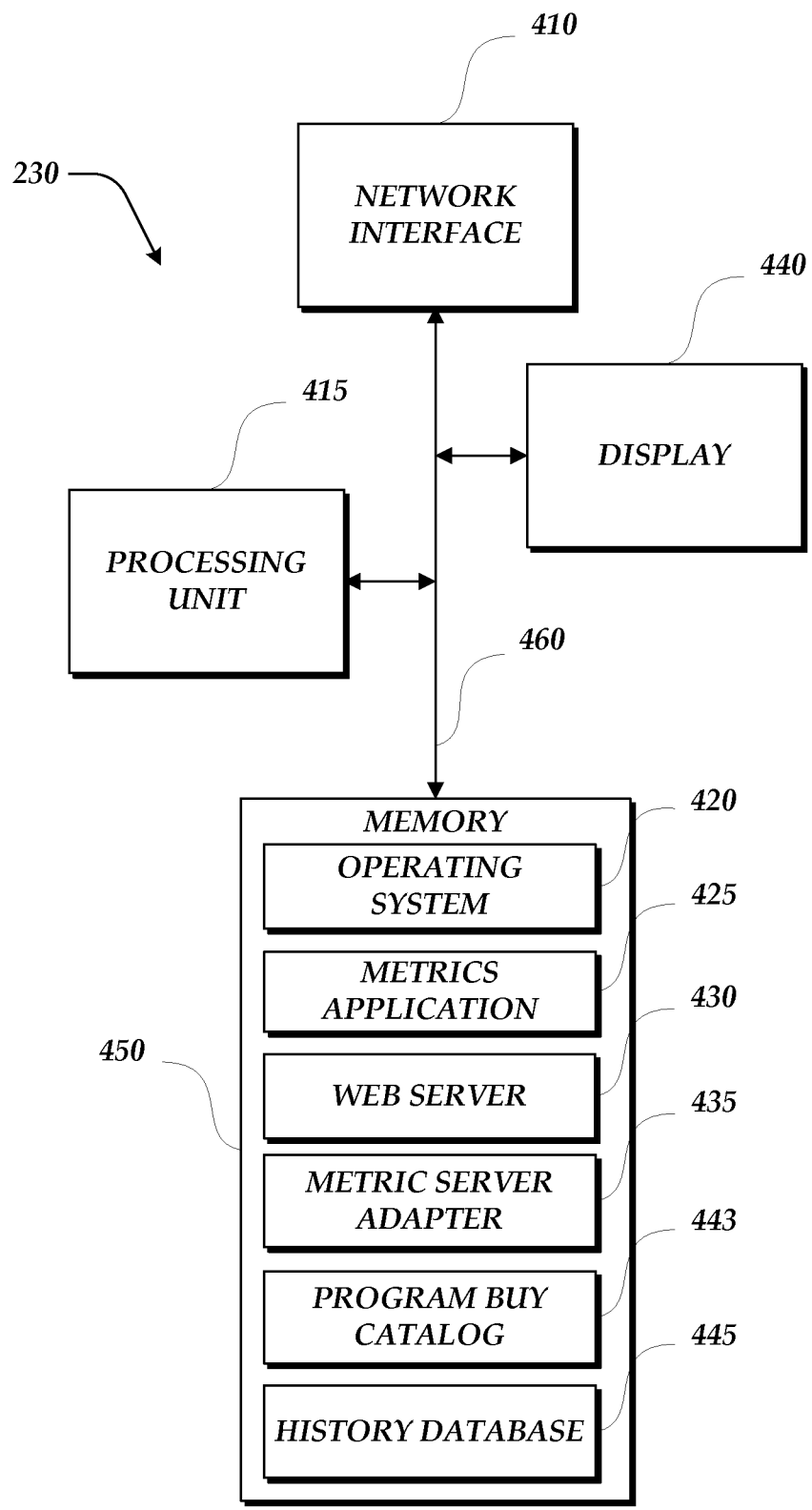
FIG. 4 is a block diagram of the several components of an information server shown in FIG. 2 that is used to supply information on a particular route.

As will be described in more detail below, the user interface which allows products to be ordered by the buyers are supplied by a remote server, i.e., the information server 230 located elsewhere on the Internet, as illustrated in FIG. 2. FIG. 4 depicts several of the key components of the information server 230. Those of ordinary skill in the art will appreciate that the information server 230 includes many more components than shown in FIG. 4. However, it is not necessary that all of these generally conventional components be shown in order to disclose an illustrative embodiment for practicing the present invention. As shown in FIG. 4, the information server 230 is connected to the Internet 100 via a network interface 410. Those of ordinary skill in the art will appreciate that the network interface 410 includes the necessary circuitry for connecting the information server 230 to the Internet 100, and is constructed for use with the TCP/IP protocol.

The information server 230 also includes a processing unit 415, a display 440, and a mass memory 450, all interconnected along with the network interface 410 via a bus 460. The mass memory 450 generally comprises a random access memory (RAM), read-only memory (ROM), and a permanent mass storage device, such as a hard disk drive, tape drive, optical drive, floppy disk drive, or combination thereof. The mass memory 450 stores the program code and data necessary for incident and route analysis as well as supplying the results of that analysis to consumers in accordance with the present invention. More specifically, the mass memory 450 stores a metrics application 425 formed in accordance with the present invention for managing the purchase forums of commodities products. In addition, mass memory 450 stores a database 445 of buyer information continuously logged by the information server 230 for statistical market analysis. It will be appreciated by those of ordinary skill in the art that the database 445 of product and buyer information may also be stored on other servers or storage devices connected to either the information server 230 or the Internet 100. Finally, mass memory 450 stores Web server software 430 for handling requests for stored information received via the Internet 100 and the WWW, and an operating system 420. It will be appreciated that the aforementioned software components may be stored on a computer-readable medium and loaded into mass memory 450 of the information server 230 using a drive mechanism associated with the computer-readable medium, such as floppy, tape, or CD-ROM drive. In addition, the data stored in the mass memory 450 and other memory can be "exposed" to other computers or persons for purposes of communicating data. Thus, "exposing" data from a computing device could mean transmitting data to another device or person, transferring XML data packets, transferring data within the same computer, or other like forms of data communications.

Figure 5:
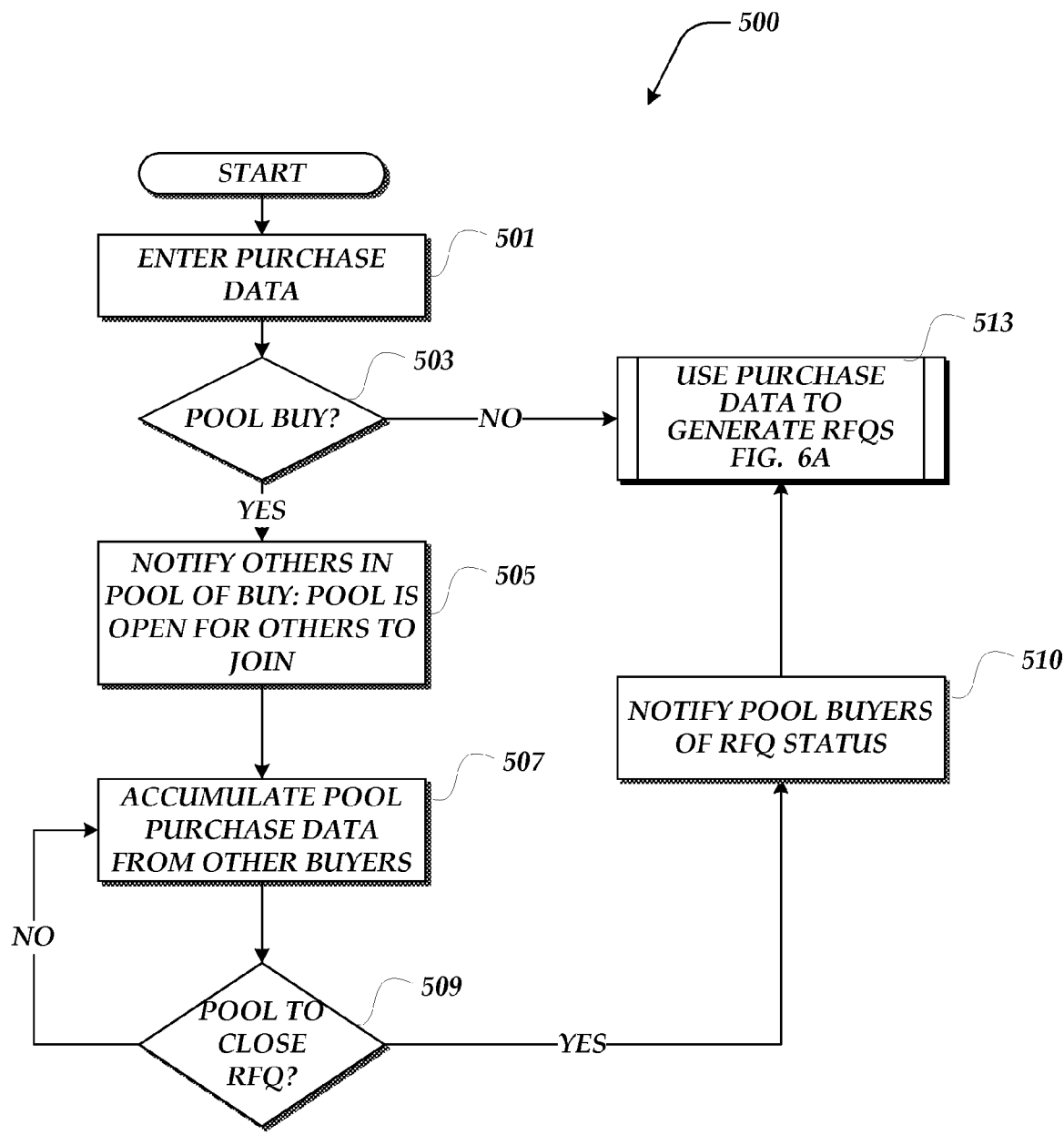
FIG. 5 is a flow diagram illustrating the logic of a routine used by the information server to receive and process the buyer's actions.

In accordance with one embodiment of the present invention, FIG. 5 is a flow chart illustrating the logic implemented for the creation of a Request for Quote (RFQ) by a singular buyer or a pool of buyers. In process of FIG. 5, also referred to as the pooling process 500, a buyer or a pool of buyers generate an RFQ which is displayed or transmitted to a plurality of sellers. Responsive to receiving the RFQ, the sellers then send quotes to the buyers.

In summary, the creation of the RFQ consists of at least one buyer initially entering general user identification information to initiate the process. The buyer would then define a Line Item on a Web page displaying an RFQ form. The Line Item is defined per industry specification and units of product are grouped as a "tally" per industry practice. The pooling process 500 allows buyers to combine RFQ Line Items with other buyers with like needs. In one embodiment, the pool buy feature is created by a graphical user interface where the RFQ Line Items from a plurality of buyers is displayed on a Web page to one of the pool buyers, referred to as the pool administrator. The server 230 also provides a Web-based feature allowing the pool administrator to selectively add each RFQ Line Item to one combined RFQ. The combined RFQ is then sent to at least one vendor or seller. This feature provides a forum for pooling the orders of many buyers, which allows individual entities or divisions of larger companies to advantageously bid for larger orders, thus providing them with more bidding power and the possibility of gaining a lower price.

Figure 8A:
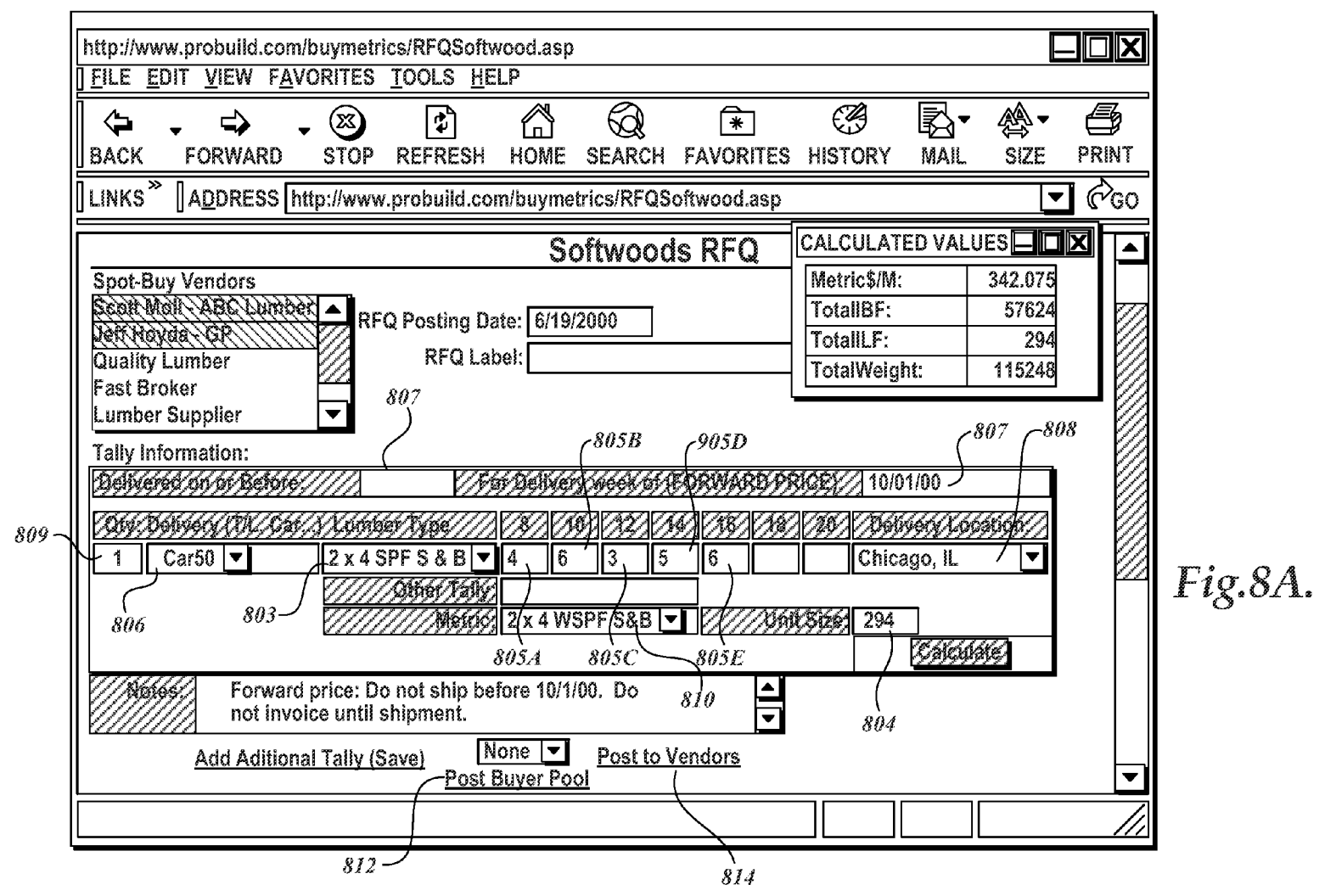

The pooling process 500 begins in a step 501 where a buyer initiates the process by providing buyer purchase data. In step 501, the buyer accesses a Web page transmitted from the server 230 configured to receive the buyer purchase data, also referred to as the product specification data set or the Line Item data. One exemplary Web page for the logic of step 501 is depicted in FIG. 8A. As shown in FIG. 8A, the buyer enters the Line Item data specifications in the fields of the Web page. The Line Item data consists of lumber species and grade 803, number of pieces per unit 804, quantities of the various units comprising the preferred assortment in the tally 805A-E, delivery method 806, delivery date 807, delivery location 808, and the overall quantity 809. In one embodiment, the buyer must define the delivery date as either contemporaneous "on-or-before" delivery date, or specify a delivery date in the future for a "Forward Price" RFQ. In addition, the buyer selects a metric or multiple metrics in a field 810 per RFQ Line Item (tally). As described in more detail below, the metric provides pricing data that is used as a reference point for the buyer to compare the various quotes returned from the sellers. The buyer RFQ Line Item data is then stored in the memory of the server 230.

Returning to FIG. 5, at a next step 503, the server 230 determines if the buyer is going to participate in a pool buy. In the process of decision block 503, the server 230 provides an option in a Web page that allows the buyer to post their Line Item data to a vendor or post their Line Item data to a buyer pool. The window illustrated in FIG. 8A is one exemplary Web page illustrating these options for a buyer. As shown in FIG. 8A, the links "Post Buyer Pool" 812 and "Post to Vendors" 814 are provided on the RFQ Web page.

At a step 503, if the buyer does not elect to participate in a pool buy, the process continues to a step 513 where the server 230 generates a request for a quote (RFQ) from the buyer's Line Item data. A detailed description of how the server 230 generates a request for a quote (RFQ) is summarized below and referred to as the purchase order process 600A depicted in FIG. 6A.

Alternatively, at the decision block 503, if the buyer elects to participate in a pool buy, the process continues to a step 505 where the system notifies other buyers logged into the server 230 that an RFQ is available in a pool, allowing other buyers to add additional Line Items (tallies) to the RFQ. In this part of the process, the Line Items from each buyer are received by and stored in the server memory. The Line Items provided by each buyer in the pool are received by the server 230 using the same process as described above with reference to block 501 and the Web page of FIG. 8A. All of the Line Items stored on the server 230 are then displayed to a pool administrator via a Web page or an email message. In one embodiment, the pool administrator is one of the buyers in a pool where the pool administrator has the capability to select all of the Line Item data to generate a combined RFQ. The server 230 provides the pool administrator with this capability by the use of any Web-based communicative device, such as email or HTML forms. As part of the process, as shown in steps 507 and 509, the pool may be left open for a predetermined period of time to allow additional buyers to add purchase data to the current RFQ.

At a decision block 509, the server 230 determines if the pool administrator has closed the pool. The logic of this step 509 is executed when the server 230 receives the combined RFQ data from the pool administrator. The pool administrator can send the combined RFQ data to the server 230 via an HTML form or by other electronic messaging means such as email or URL strings. Once the server 230 has determined that the pool is closed, the process continues to block 510 where the Line Items from each buyer (the combined RFQ) are sent to all of the buyers in the pool. The process then continues to the step 513 where the server 230 sends the combined RFQ to the vendors or sellers.

Figure 6A:
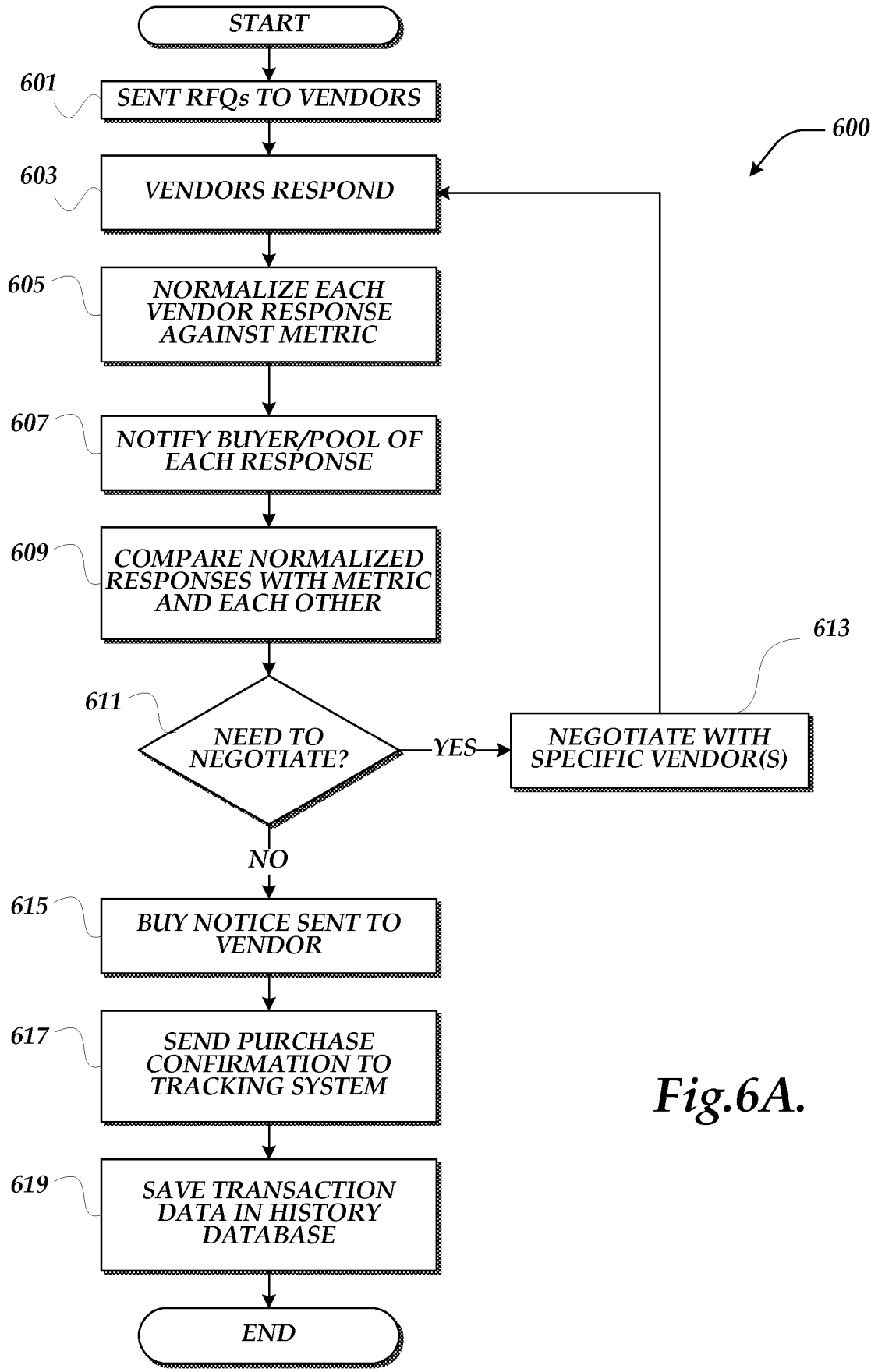
FIGS. 6A-6B are flow diagrams illustrating another embodiment of the logic used by the information server to receive and process the quotes and quote requests of both buyers and vendors.

Referring now to FIG. 6A, one embodiment of the purchase-negotiation process 600 is disclosed. The purchase-negotiation process 600 is also referred to as a solicited offer process or the market purchase process. In summary, the purchase-negotiation process 600 allows at least one buyer to submit an RFQ and then view quotes from a plurality of vendors and purchase items from selected vendor(s). The logic of FIG. 6A provides buyers with a forum that automatically manages, collects, and normalizes the price of desired commodity items. The purchase-negotiation process 600 calculates a normalized price data set that is based on a predefined metric(s). The calculation of the normalized price data set in combination with the format of the Web pages described herein create an integrated forum where quotes for a plurality of inherently dissimilar products can be easily obtained and compared.

The purchase-negotiation process 600 begins at a step 601 where the RFQ, as generated by one buyer or a pool of buyers in the process depicted in FIG. 5, is sent to a plurality of computing devices 250 associated with a plurality of sellers or vendors. The vendors receive the RFQ via a Web page transmitted by the server 230. In one embodiment, the vendors receive an email message having a hypertext link to the RFQ Web page to provide notice to the vendor. Responsive to the information in the buyers' RFQ, the process then continues to a step 603 where at least one vendor sends their quote information to the server 230.

In the process of step 603, the vendors respond to the RFQ by sending their price quote to the server 230 for display via a Web page to the buyer or buyer pool. Generally described, the vendors send an HTML form or an email message with a price and description of the order. The description of the order in the quote message contains the same order information as the RFQ.

Figure 8B:
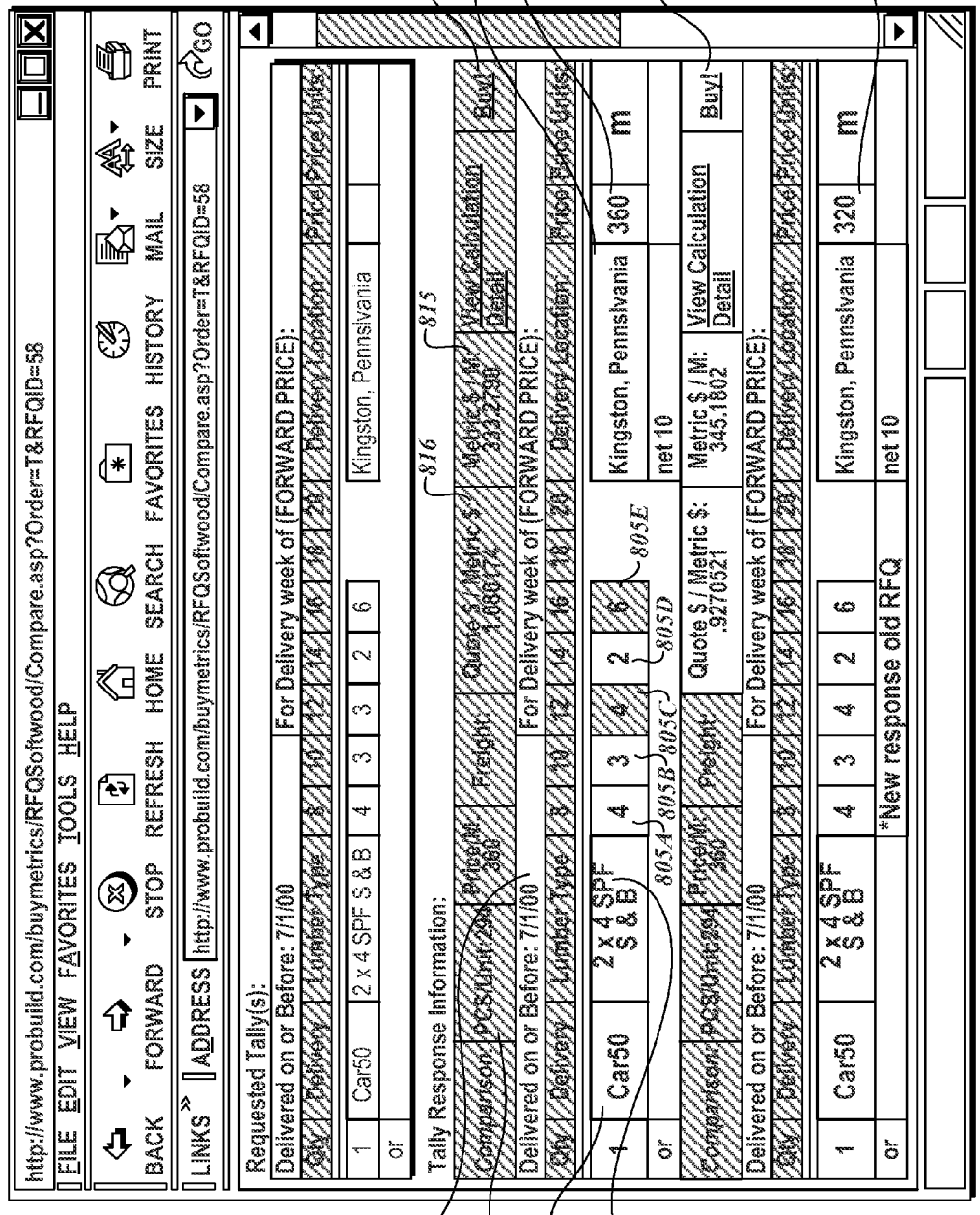

FIG. 8B illustrates one exemplary Web page of a vendor quote that is displayed to the buyer. As shown in FIG. 8B, the vendor quote includes the vendor's price 813, the lumber species and grade 803, number of pieces per unit 804, quantities of the various units comprising the preferred assortment in the tally 805A-E, delivery method 806, delivery date 807, and delivery location 808. In the quote response message, the vendor has the capability to modify any of the information that was submitted in the RFQ. For example, the vendor may edit the quantity values for the various units comprising the preferred assortment in the tally 805A-E. This allows the vendor to adjust the buyer's request according to the vendor's inventory, best means of transportation, etc. All of the vendor's quote information is referred to as price data set or the RFQ Line Item (tally) quote.

Returning to FIG. 6A, the process continues to a step 605, where the server 230 normalizes the price of each RFQ Line Item (tally) quote from each vendor. The normalization of the vendor's price is a computation that adjusts the vendor's price utilizing data from a metric. The normalization process is carried out because each vendor may respond to the Line Items of an RFQ by quoting products that are different from a buyer's RFQ and/or have a different tally configuration. The normalization of the pricing allows the buyers to objectively compare the relative value of the different products offered by the plurality of vendors. For example, one vendor may produce a quote for an RFQ of: one unit of 2×4×12, two units of 2×4×12, and three units of 2×4×16. At the same time, another vendor may submit a quote for three units of 2×4×12, one unit of 2×4×12, and two units of 2×4×16. Even though there is some difference between these two offerings, the price normalization process provides a means for the buyer to effectively compare and evaluate the different quotes even though there are variations in the products. The price normalization process 900 is described in more detail below in conjunction with the flow diagram of FIG. 9.

Returning again to FIG. 6A, at step 607 the vendor's quote information is communicated to the buyer's computer for display. As shown in FIG. 8B and described in detail above, the vendor's quote is displayed via a Web page that communicates the vendor's quote price 813 and other purchase information. In addition, the vendor's quote page contains a metric price 815 and a quote price vs. metric price ratio 816. The metric price 815 and the quote price vs. metric price ratio 816 are also referred to as a normalized price data value. A ratio higher than one (1) indicates a quote price that is above the metric price, and a lower ratio indicates a quote price that is below the metric price.

Next, at a step 609, the buyer or the administrator of the buyer pool compares the various products and prices quoted by the vendors along with the normalized price for each Line Item on the RFQ. In this part of the process, the buyer may decide to purchase one of the products from a particular vendor and sends a notification to the selected vendor indicating the same. The buyer notifies the selected vendor by the use of an electronic means via the server 230, such as an HTML form, a chat window, email, etc. For example, the quote Web page depicted in FIG. 8B shows two different quotes with two different tallies, the first quote price 813 of $360, and the second quote price 813A of $320. If the buyer determines that they prefer to purchase the materials listed in the first quote, the buyer selects the "Buy!" hyperlink 820 or 820A associated with the desired tally.

If the buyer is not satisfied with any of the listed vendor quotes, the server 230 allows the buyer to further negotiate with one or more of the vendors to obtain a new quote. This step is shown in decision block 611, where the buyer makes the determination to either accept a quoted price or proceed to a step 613 where they negotiate with the vendor to obtain another quote or present a counter offer. Here, the server 230 provides a graphical user interface configured to allow the buyer and one vendor to electronically communicate, using, e.g., a chat window, streaming voice communications, or other standard methods of communication. There are many forms of electronic communications known in the art that can be used to allow the buyer and vendors to communicate.

The buyer and seller negotiate various quotes and iterate through several steps 603-613 directed by the server 230, where each quote is normalized, compared, and further negotiated until a quote is accepted by the buyer or negotiations cease. While the buyer and seller negotiate the various quotes, the server 230 stores each quote until the two parties agree on a price. At any step during the negotiation process, the system always presents the buyer with an option to terminate the negotiation if dissatisfied with the quote(s).

At decision block 611, when a buyer agrees on a quoted price, the process then continues to a step 615 where the buyer sends a notification message to the vendor indicating they have accepted a quote. As described above with reference to steps 603-613, the buyer notification message of step 615 may be in the form of a message on a chat window, email, by an HTML form, or the like. However, the buyer notification must be transmitted in a format that allows the system to record the transaction. The buyer notification may include all of the information regarding the specifications by RFQ Line Item, such as, but not limited to, the buy price, date and method of shipment, and payment terms.

The purchase-negotiation process 600 is then finalized when the system, as shown in a step 617, sends a confirmation message to a tracking system. The confirmation message includes all of the information related to the agreed sales transaction.

Optionally, the process includes a step 619, where the server 230 stores all of the information related to RFQ, offers, and the final sales transaction in a historical database. This would allow the server 230 to use all of the transaction information in an analysis process for providing an improved method of obtaining a lower market price in future transactions and in identifying optimum purchasing strategy. The analysis process is described in further detail below. Although the illustrated embodiment is configured to store the data related to the sales transactions, the system can also be configured to store all of the iterative quote information exchanged between the buyer and vendor.

Figure 6B:
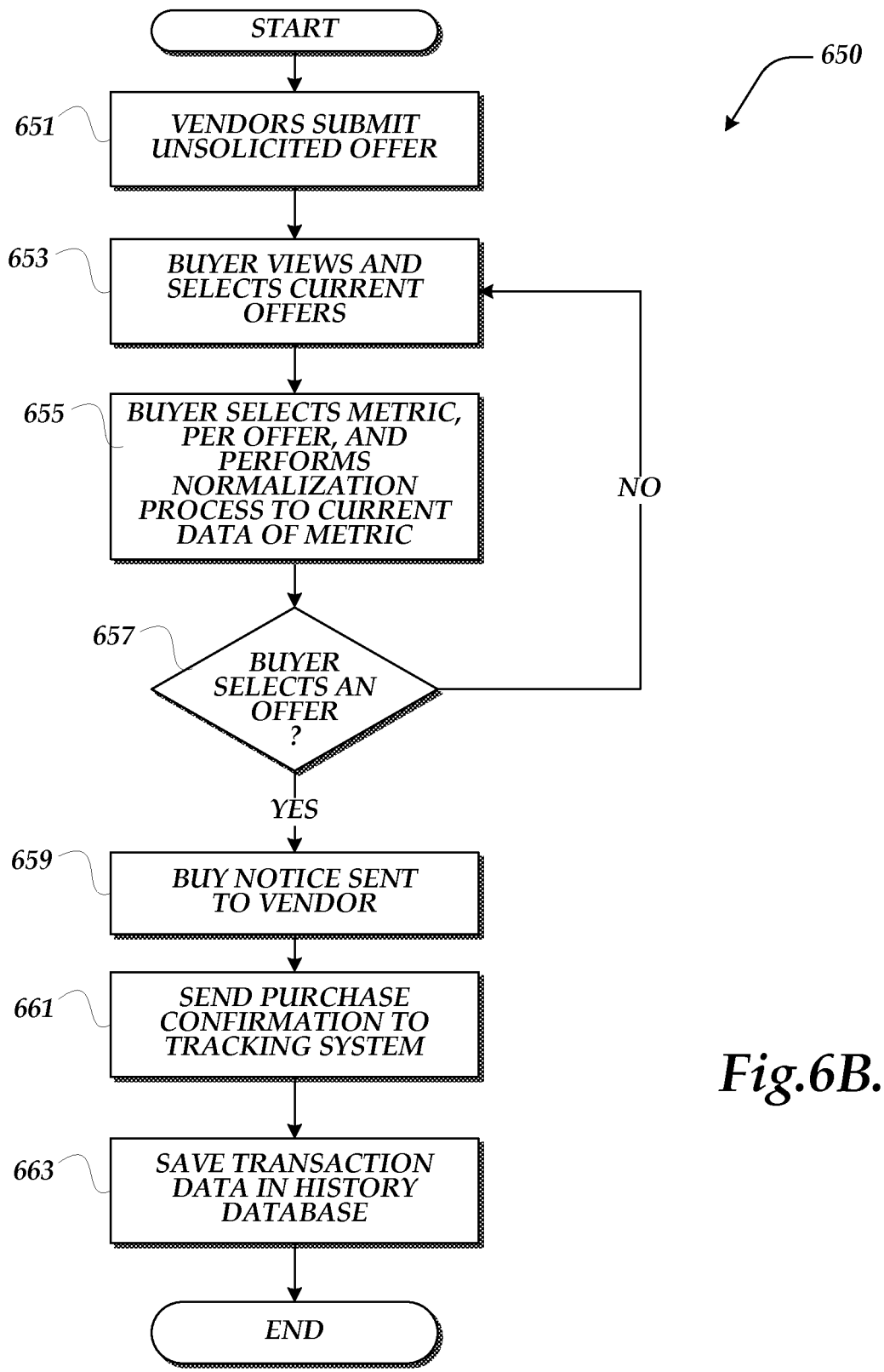

Referring now to FIG. 6B, an embodiment of the unsolicited offer process 650 is disclosed. In summary, the unsolicited offer process 650, also referred to as the unsolicited market purchase process, allows at least one buyer to view unsolicited offers from a plurality of vendors and purchase items from a plurality of vendors from the offers. The logic of FIG. 6B provides buyers with a forum that automatically manages, collects, and normalizes price quotes based on metric data. By the price normalization method of FIG. 6B, the server 230 creates an integrated forum where offers from a plurality of inherently dissimilar products can be obtained and normalized for determination of purchase.

The unsolicited offer process 650 begins at a step 651 where the plurality of vendors are able to submit offers to the server 230. This part of the process is executed in a manner similar to step 603 of FIG. 6A, where the vendor submits a quote to the server 230. However, in the Web page of step 651, the server 230 generates a Web page containing several tallies from many different vendors. In addition, at step 651, the server 230 stores all of the unsolicited offer data provided by the vendors.

Next, at a step 653, a buyer views the offers stored on the server 230. This part of the process is carried out in a manner similar to the process of step 603 or 607 where the server 230 displays a plurality of offers similar to the tallies depicted in FIG. 8A.

Next, at a step 655, the buyer selects a metric for the calculation of the normalized price associated with the selected offer. As described in more detail below, metrics may come from publicly available information, i.e., price of futures contracts traded on the Chicago Mercantile Exchange, subscription services such as Crowes™ or Random Lengths™ accessed via the metric server adapter 435 (shown in FIG. 4), or internally generated metrics derived from the data stored in the server 230. The normalization calculation, otherwise referred to as the normalization process, occurs each time the buyer views a different offer, and the normalization calculation uses the most current metric data for each calculation. The normalization process is carried out because each vendor will most likely offer products that may vary from products of other vendors, and have a different tally configuration from those supplied by other vendors. The normalization of the pricing allows the buyers to compare the relative value of the different products offered by the number of vendors. The metric price for each selected offer is displayed in a similar manner as the metric price 815 and 816 shown in the Web page of FIG. 8B.

Next, at decision block 657, the buyer selects at least one offer for purchase. This is similar to the process of FIG. 6A in that the buyer selects the "Buy!" hyperlink 820 associated with the desired tally to purchase an order. The process then continues to steps 659-663, where at step 659 the process transmits a buy notice to the vendor, then at step 661 sends a purchase confirmation to the tracking system, and then at step 663 saves the transaction data in the server database. The steps 659-663 are carried out in the same manner as the steps 615-619 of FIG. 6A. In the above-described process, the buyer notification may include all of the information regarding the specifications by RFQ Line Item, and data such as, but not limited to, the buy price, date, and method of shipment, and the payment terms.

Figure 7:
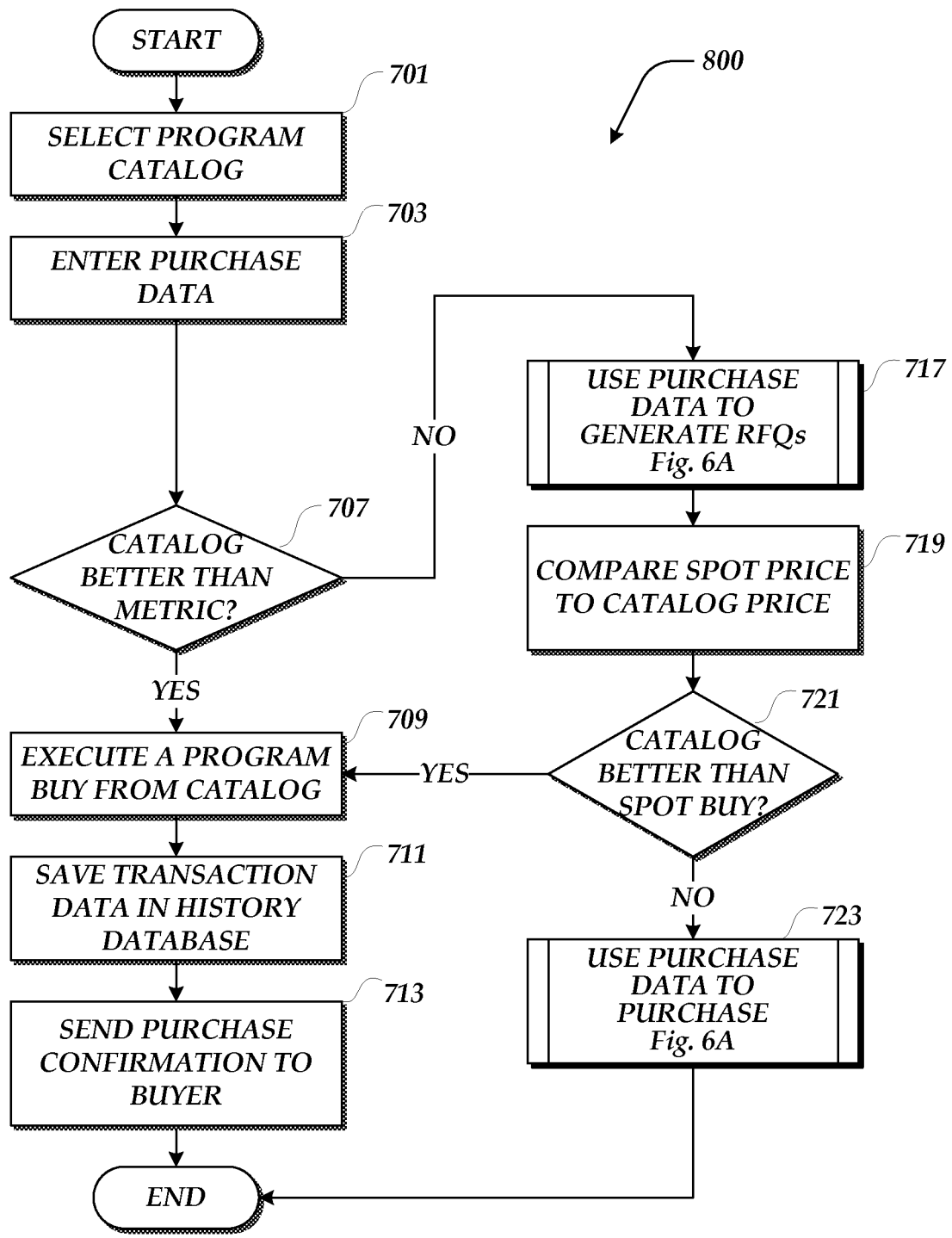
FIG. 7 is a flow diagram illustrating another embodiment of the logic used by the information server to execute the process of a catalog purchase.

Referring now to FIG. 7, a flow diagram illustrating yet another embodiment of the present invention is shown. FIG. 7 illustrates the catalog purchase process 700. This embodiment allows buyers to search for a catalog price of desired commerce items, enter their purchase data based on the pre-negotiated catalog prices, and to compare those catalog prices with a selected metric price and the current market price, wherein the current market price is determined by the purchase-negotiation process 600.

The process starts at a step 701 where the buyer selects a program buy catalog 443. The program buy catalog 443 provides buyers with the published or pre-negotiated price of the desired products. Next, at a step 703, based on the catalog information, the buyer then enters their purchase data. Similar to the step 501 of FIG. 5 and the tally shown in FIG. 8A, the buyer sends purchase data to the server 230, such as the desired quantity of each item and the lumber species, grade, etc.

The process then proceeds to decision block 707 where the buyer makes a determination of whether to purchase the items using the catalog price or purchase the desired product in the open market. Here, the server 230 allows the user to make this determination by displaying the metric price of each catalog price. This format is similar to the metric price 815 and 816 displayed in FIG. 8B.

At decision block 707, if the buyer determines that the catalog price is better than a selected metric price, the process then proceeds to steps 709, 711, and 713, where a program buy from the catalog is executed, and the buyer's purchase information is stored on the server 230 and sent to the vendor's system to confirm the sale. These steps 711-713 are carried out in the same manner as the confirmation and save steps 617 and 619 as shown in FIG. 6A.

At decision block 707, if the buyer determines that the metric price is better than the catalog price, the process continues to a step 717 where the buyer's purchase data is entered into an RFQ. At this step, the process carries out the first five steps 601-609 of the method of FIG. 6A to provide buyers with the price data from the open market, as well as provide the normalized prices for each open market quote. At a step 719, the server 230 then displays a Web page that allows the user to select from a purchase option of a catalog or spot (market) purchase. At decision block 721, based on the displayed information, the buyer will then have an opportunity to make a determination of whether they will proceed with a catalog purchase or an open market purchase.

At decision block 721, if the buyer proceeds with the catalog purchase, the process continues to step 709 where the catalog purchase is executed. The steps 709-713 used to carry out the catalog purchase are the same as if the buyer had selected the catalog purchase in step 707. However, if at decision block 721 the buyer selects the option to proceed with the market purchase, the process continues to a step 723 where the RFQ generated in step 717 is sent to the vendor. Here, the process carries out the steps of FIG. 6 to complete the open market purchase. More specifically, the process continues to step 609 where the buyer compares the normalized prices from each vendor. Once a vendor is selected, the negotiation process of steps 603-613 is carried out until the buyer decides to execute the purchase. Next, the transaction steps 615-619 are carried out to confirm the purchase, notify the tracking system, and save the transactional data on the historical database.

Optionally, the process can include a step where the server 230 stores all of the information related to program buy and metric comparisons, and the final sales transaction in a historical database. This would allow the server 230 to use all of the transaction information in an analysis process for providing an improved method of obtaining the value of the program. Although the illustrated embodiment is configured to store the data related to the sales transactions, the system can also be configured to store all of the iterative quote information exchanged between the buyer and vendor.

The analysis process allows the server 230 to utilize the sales history records stored in steps 619 and 711 to generate price reports for various third parties as well as provide a means of calculating current market prices for products sold in the above-described methods. The sales history records are also used as the source for a metric, such as those used in the process of FIGS. 6A, 6B, and 7. As shown in steps 619, 663, and 711, the server 230 continually updates the historical database for each sales transaction. The analysis reporting process allows a buyer or manager of buyers to conduct analysis on the historical information. This analysis would include multi-value cross compilation, for purposes of determining purchasing strategies, buyer effectiveness, program performance, vendor performance, and measuring effectiveness of forward pricing as a risk management strategy.

Figure 9:
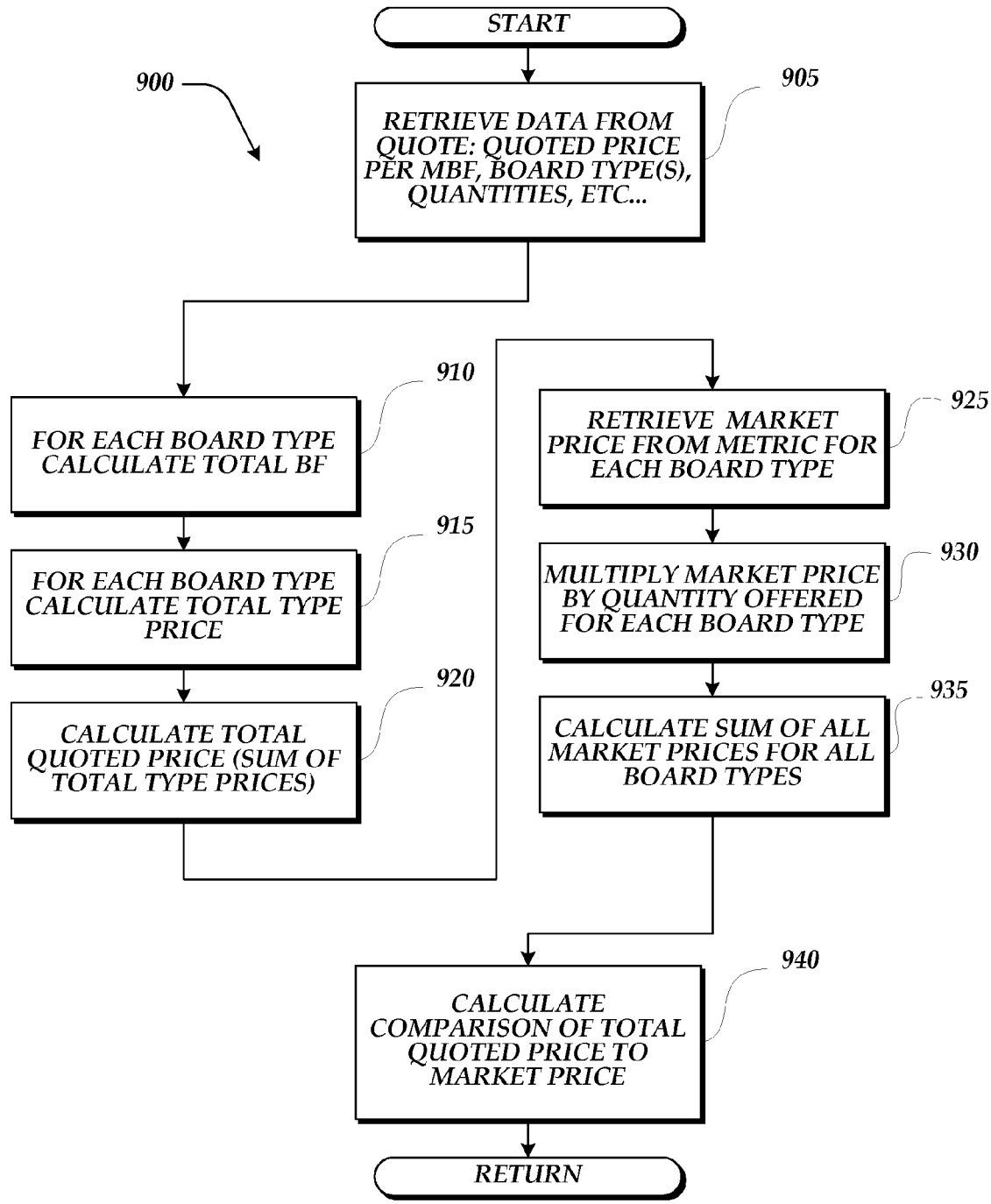
FIG. 9 is a flow diagram illustrating one embodiment of the normalization process described herein.

Referring now to FIG. 9, a flow diagram illustrating the logic of the normalization process 900 is shown. The logic of the normalization process 900 resides on the server 230 and processes the quotes received from commodity sellers. The logic begins at a step 905 where quote data is obtained from the seller in response to the buyer's RFQ as described above.

Next, at a step 910, routine 900 iteratively calculates the board footage (BF) of each type of lumber. Once all the totals are calculated for each type, routine 900 continues to a step 915 where the server 230 calculates the total type price.

At step 915, routine 900 iteratively calculates the total type price for the amount of each type of lumber specified in the quote. This is accomplished by taking the total board footage (BF), calculated in block 910, and multiplying the total BF by the price per MBF specified in the quote. Once all the prices are calculated for each type, routine 900 continues to a step 920 where the server 230 calculates total quoted price. At step 920, the routine 900 calculates the total price for the quote by summing all of the total type prices calculated at step 915.

At a step 925, routine 900 iteratively retrieves the most current price for each type of lumber specified in the quote from a predefined metric source(s). Metrics may come from publicly available information, i.e., price of futures contracts traded on the Chicago Mercantile Exchange, subscription service publications such as Crowes™ or Random Lengths™, or internally generated metrics derived from the server database. Once all the prices are retrieved for each type, at a step 930, the routine 900 then iteratively calculates the market price for the quantity of each type of lumber in the quote. Once the totals for all types are calculated, routine 900 continues to a step 935 where the routine 900 calculates the total market price for the quote by summing all the most current prices calculated in step 930. Although this example illustrates that steps 910-920 are executed before steps 925-935, these two groups of steps can be executed in any order, or in parallel, so long as they are both executed before a comparison step 940.

At step 940, routine 900 compares the total quoted to the metric price to arrive at a comparative value. In one exemplary embodiment of the current invention, the comparative value is a "percent of metric" value. A value higher than one hundred (100) percent indicates a price that is above the metric rate, and a lower percent indicates a price that is below the metric rate.

The operation of the routine 900 can be further illustrated through an example utilizing specific exemplary data. In the example, a buyer sends out a request for quote (RFQ) requesting a lot of 2×4 S&B lumber consisting of five units of 2"×4"×8', two units of 2"×4"×14', and five units of 2"×4"×16'. The buyer then receives quotes from three sellers. Seller A responds with a tally of six units of 2"×4"×8', four units of 2"×4"×14', and three units of 2"×4"×16' for $287 per thousand board feet. Seller B responds with a lot of five units of 2"×4"×8', one unit of 2"×4"×14', and six units of 2"×4"×16' for $283 per thousand board feet. Seller C responds with a lot of one unit of 2"×4"×8', five units of 2"×4"×14', and five units of 2"×4"×16' for $282 per thousand board feet. Suppose also that the typical unit size is 294 pieces/unit, and the metric or reported market price for 2"×4"×8's is $287.50, for 2"×4"× 14's it is $278.50, and for 2"×4"×16' it is $288.

Viewing the MBF prices for the respective quotes is not particularly informative, given that certain lengths of lumber are more desirable and priced accordingly in the marketplace. By processing the quote from Seller A using routine 900, we arrive at a total MBF of 29.792, giving a total quoted price of $8,550.30. The selected metric price for the same types and quantities of lumber would be $8,471.12; therefore, the quoted price would have a percent of market value of 100.93%. Processing the quote from Seller B using routine 900, we arrive at a total MBF of 29.400, giving a total quoted price of $8,320.20. The selected metric price for the same types and quantities of lumber, however, would be $8,437.21; therefore, the quoted price would have a percent of market value of 98.61%. Finally, processing the quote from Seller C using routine 900, we arrive at a total MBF of 30.968, giving a total quoted price of $8,732.98. The selected metric price for the same types and quantities of lumber, however, would be $8,767.66; therefore, the quoted price would have a percent of market value of 99.38%. By looking at the percent of selected metric value, it is apparent that the price from Seller B is a better value. As shown in the methods of FIGS. 5-7, this price normalization process allows users to compare inherently different offers having different quality and quantity values.

In yet another example of an application of the normalization process, additional exemplary data is used to demonstrate the analysis of a transaction having one RFQ from a buyer and two different quotes from a seller, normalized to comparable product of another species. In this example, the buyer produces an RFQ listing the following items: one carload of Eastern SPF (ESPF) lumber having four units of 2"×4"×8', four units of 2"×4"×10', six units of 2"×4"×12', two units of 2"×4"×14', and six units of 2"×4"×16'. The vendor then responds with two different quotes with two different unit tallies and two different prices. The first response lists a quote price of $320 per thousand board feet and a slight modification of the tally provides four units of 2"×4"×8', four units of 2"×4"×10', six units of 2"×4"×12', three units of 2"×4"×14', and five units of 2"×4"×16'. The second response quotes per the requested tally at a price of $322 per thousand board feet. Both quotes list the delivery location as "Chicago."

Figure 8C:
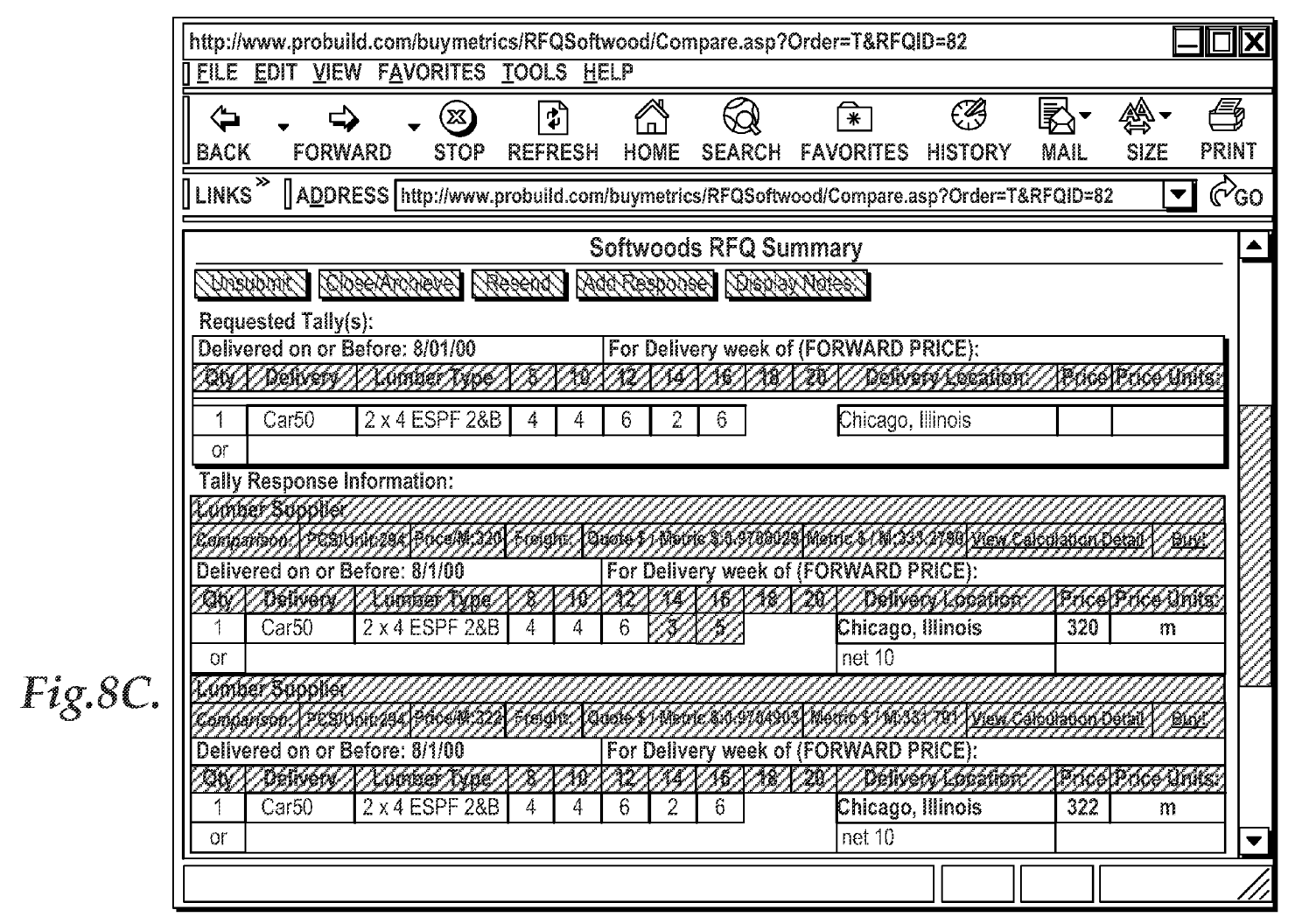
Figure 8D:

To display the quotes, the server 230 produces a Web page similar to that displayed in FIG. 8C, where the vendor's modified tally is displayed in highlighted text. The buyer can then view summary metric comparison or select the hypertext link "View Calculation Detail," which then invokes the server 230 to produce a Web page as shown in FIG. 8D. Referring now to the Web page illustrated in FIG. 8D, the data produced by the server 230 compares the response to a selected metric of a different species, Western SPF (WSPF), for items of the same size, grade, and tally. The market price for the same 2×4 tally of ESPF and WSPF are thus simultaneously compared. In an example, Eastern quoted at $322 per thousand board feet, Western metric (Random Lengths™ Jun. 26, 2000 print price plus freight of $80 as defined in Metric Manager) for the same tally being $331.791. This metric comparison is also represented as Quote/Metric Value or Eastern price representing 0.970490, or 97% of comparable Western product.

In review of the normalization process, the buyer must select a metric source for price information for a defined item given a set of attributes, i.e., grade, species, and size. The metric may then be mapped to the RFQ item for comparison and does not have to be equivalent of the item. For instance, as explained in the above-described example, it may be desirable to map the market relationship of one commodity item to another. The most current pricing data for the metric is electronically moved from the selected source to the server 230. As mentioned above, metrics may come from publicly available information, (i.e., price of futures contracts traded on the Chicago Mercantile Exchange), or subscription services, (i.e., Crowes™ or Random Lengths™ publications), or be an internal metric generated by the server 230. This metric data is used in the normalization process for all calculations, as described with reference to the above-described methods.

While the preferred embodiment of the invention has been illustrated and described, it will be appreciated that within the scope of the appended claims, various changes can be made therein without departing from the spirit of the invention. For example, in an agricultural commodity, an order for Wheat U.S. #2 HRW could be compared to a selected metric of Wheat U.S. #2 Soft White, similar to how different species are analyzed in the above-described example.

The above system and method can be used to purchase other commodity items, such as in the trade of livestock. In such a variation, order information such as a lumber tally would be substituted for a meat type, grade, and cut. Other examples of commodity items include agricultural products, metals, or any other items of commerce having several order parameters.

The embodiments of the invention in which an exclusive property or privilege is claimed are defined as follows:

1. A computer-implemented method for evaluating the market value of items, the method comprising:
   receiving, by a computer, one or more product specification data sets that identify at least one item that is defined by two or more parameters, or a plurality of items that differ in accordance with at least one parameter; and
   for at least one item identified in a received product specification data set:
   obtaining, from one or more databases, a plurality of transaction data sets comprised of previously exposed transaction data between buyers and sellers, wherein the transaction data represents market reference price data of a particular period of time, and wherein the transaction data sets are responsive to the at least one item identified in the product specification data set;
   adapting the market reference price data by applying one or more pre-defined rules, variables, or criteria operably associated with the item, a parameter of the item, and/or the one or more databases, to the market reference price data, whereby the plurality of transaction data sets are transformed into normalized market price data sets; and
   using the normalized market price data sets:
   calculating a market value for the at least one item in the product specification data set; and
   communicating the calculated market value for the at least one item in the product specification data set to at least one output.

2. The method of claim 1, wherein the transaction data includes price data exposed by at least one buyer agent or at least one seller agent.

3. The method of claim 1, wherein the transaction data was exposed by a third party.

4. The method of claim 1, wherein the at least one item identified in the product specification data set is a combined item that represents a bundled product, a tally, a list, or an assembly of one or more components, and wherein the combined item is offered or sold for a single combined price, the method further comprising:
   using the normalized market price data sets, calculating a market value for each component of the combined item;

multiplying the calculated market value of each component by a quantity value for each component, thereby generating a market value total for each component; and summing the market value total for each component of the combined item to generate a combined market value total for the combined item.

5. The method of claim 1, further comprising:

receiving, by a computer, a plurality of product specification data sets; and combining the plurality of product specification data sets to create a combined product specification data set, wherein the at least one item is identified in the combined product specification data set and the market value calculated for the at least one item is communicated to the at least one output.

6. The method of claim 1, wherein at least one parameter identified in the product specification data set or operably associated with at least one item identified in the product specification data set pertains to a grade, a rating measure, a species, an item type, a brand, a quantity, a size, a unit of measure, a tally, a location, a method of delivery, a delivery date, a time of service, a warranty, a payment term, or a transaction type.

7. The method of claim 6, wherein the delivery date or time of service includes a forward price with one or more delivery or service dates in the future.

8. The method of claim 7, wherein delivery comprises a financial delivery.

9. The method of claim 6, wherein the payment term includes a term of credit.

10. The method of claim 1, wherein the product specification data set specifies a price that is defined as a formula and/or derived from one or more prices to be calculated or reported at one or more periods of time in the future.

11. The method of claim 10, wherein the price defined as a formula is a metric value to be calculated using normalized market price data of a specified time period, and wherein the calculated metric value is a volume-weighted average price for the at least one item in the product specification data set, or a formula-defined increment thereof.

12. The method of claim 10, further comprising defining the one or more databases and/or the one or more periods of time when the market value is to be calculated or communicated.

13. The method of claim 1, wherein the at least one item identified in the product specification data set represents a physical product, a raw material, an intangible product, a service, or a combination thereof.

14. The method of claim 1, wherein the at least one item for which market reference price data is obtained has one or more specified units of measure, the method further comprising verifying that the one or more units of measure are equal to corresponding units of measure as specified for the item in the product specification data set, and if not equal, mathematically converting the market reference price data according to the corresponding units of measure.

15. The method of claim 1, further comprising mathematically normalizing data defined by units of measure in the product specification data set and in the market reference price data to standardized or common units of measure.

16. The method of claim 1, wherein the market reference price data is indicative of a current market price for the one or more items in the product specification data set.

17. The method of claim 1, wherein the market reference price data is indicative of a market price for the at least one item in the product specification data set over a specified period of time.

18. The method of claim 1, further comprising filtering the normalized market price data according to one or more parameters or one or more agent-specified criteria before calculating a market value for the at least one item in the product specification data set.

19. The method of claim 18, wherein the calculated market value represents market reference data that is generated by one or more pre-selected sources of the transaction data sets.

20. The method of claim 1, wherein transaction data is obtained from at least one external database.

21. The method of claim 1, wherein transaction data stored in at least one of the one or more databases is obtained from multiple sources.

22. The method of claim 1, further comprising receiving instructions from an agent, wherein the instructions are associated with the at least one item in the product specification data set, and wherein the instructions indicate selection of an alternate item, an alternate parameter, an alternate database, or an alternate third-party source from which to obtain at least one independently reported market value for the at least one item in the product specification data set.

23. The method of claim 1, wherein the transaction data sets responsive to the at least one item in the product specification data set includes only transaction data exposed in response to a specific inquiry or event and over the same period of time.

24. The method of claim 1, wherein the at least one item in the product specification data set, or at least one parameter identified in the product specification data set or in a transaction data set, is operably associated with one or more pre-defined rules, variables, or criteria for adapting and managing metric data, wherein such operable association is static and automatically applied or dynamic and conditionally applied.

25. The method of claim 24, wherein the rules, variables, or criteria are pre-defined by at least one agent and apply when the at least one agent provides a product specification data set containing one or more items for market valuation.

26. The method of claim 24, wherein at least one responsive transaction data set has one or more parameters that vary from the product specification data set, and wherein one or more of the pre-defined rules, variables, or criteria causes an adjustment value to be calculated and applied to the transaction data in the transaction data set with the one or more varying parameters.

27. The method of claim 1, further comprising:

obtaining exposed transaction data for an alternate item, wherein the transaction data represents market reference price data for the alternate item, and wherein the alternate item is a substitute item or an item with at least one differing parameter value from that of the at least one item in the product specification data set;

adapting the market reference price data for the alternate item by applying one or more pre-defined rules, variables, or criteria operably associated with the item, a parameter of the item, and/or the one or more databases, to the market reference price data, whereby the transaction data is transformed into normalized market price data; and using the normalized market price data for the alternate item, calculating a market value for the alternate item for comparison to the market value of the at least one item in the product specification data set.

28. The method of claim 1, wherein the market value of the at least one item in the product specification data set is derived by a formula, a rule, or a correlation from the market value of an alternate item that is a substitute for the at least one item in the product specification data set.

29. The method of claim 1, wherein the calculated market value of the at least one item in the product specification data set is exposed to at least one other computing device.

30. The method of claim 1, further comprising:
updating the market value of the at least one item in the product specification data set by obtaining updated transaction data sets from at least one source for the at least one item, wherein the updated transaction data sets represent more-current market reference price data for the at least one item;
adapting the more-current market reference price data by applying the one or more pre-defined rules, variables, or criteria operably associated with the item, a parameter of the item, and/or the one or more databases, to the more-current market reference price data, whereby the plurality of additional transaction data sets are transformed into normalized market price data sets; and
using the normalized market price data sets, calculating an updated market value for the at least one item in the product specification data set.

31. The method of claim 30, wherein the market value of the at least one item in the product specification data set is automatically updated continuously or at a pre-configured time or interval of time, or upon the occurrence of a pre-defined event including a statistical validation failure, or upon agent instruction.

32. The method of claim 30, wherein updating the market value for the at least one item occurs in near real-time.

33. The method of claim 1, further comprising using the calculated market value of the at least one item in the product specification data set to evaluate a selling price, an offer, bid, or contract price.

34. The method of claim 1, further comprising using the calculated market value of the at least one item in the product specification data set, at least in part, to calculate or model a price at which the at least one item is to be sold or offered for sale.

35. The method of claim 1, further comprising using the calculated market value of the at least one item in the product specification data set, at least in part, to calculate, model, or evaluate the price of a bid, an offer, or a contract.

36. The method of claim 1, wherein the product specification data set includes a quantity value for the at least one item, wherein the normalized market price data comprises a comparable price per unit for the at least one item, and wherein calculating a market value for the at least one item comprises multiplying the comparable price per unit by the quantity value for the at least one item.

37. The method of claim 1, further comprising generating an output that reports the calculated market value of the at least one item in the product specification data set to one or more recipients.

38. The method of claim 1, wherein calculating a market value using the normalized market price data includes mathematically calculating a volume-weighted average price for the at least one item in the product specification data set.

39. The method of claim 1, wherein calculating a market value using the normalized market price data sets includes applying at least one algorithm that incorporates a replicable mathematical process for calculating at least one market value from a plurality of normalized values, including a mean value, a median value, or variation of a mean or median value.

40. The method of claim 1, further comprising excluding at least a portion of the transaction data or the normalized market price data for failure to meet a predetermined statistical criterion or a validation rule.

41. The method of claim 1, further comprising limiting the transaction data in a transaction data set to data from transactions that resulted in a purchase.

42. The method of claim 30, further comprising comparing the updated market value for the at least one item in the product specification data set to a corresponding prior market value, base market value, or responsive third-party reported market value for the at least one item, and communicating the comparison to the at least one output.

43. The method of claim 42, wherein said comparing includes generating a measure of relative value by dividing the updated market value by the corresponding prior market value, base market value, or responsive third-party reported market value, producing a ratio or index value.

44. The method of claim 42, further comprising calculating a value of a change in market value of the at least one item in the product specification data set from the corresponding prior market value, base market value, or responsive third-party reported market value, and generating a comparison value by dividing the value of the change by the prior market value, base market value, or responsive third-party reported market value.

45. The method of claim 42, wherein comparing the updated market value to the prior market value, base market value, or responsive third-party reported market value includes generating one or more visual representations in the form of a table, chart, or graph.

46. The method of claim 45, wherein the one or more visual representations are expandable to expose calculation detail or additional linked information.

47. A non-transitory computer-readable storage medium having computer-executable instructions stored thereon, wherein the instructions, in response to execution by one or more computing devices, cause the one or more computing devices to:
receive one or more product specification data sets that identify at least one item that is defined by two or more parameters, or a plurality of items that differ in accordance with at least one parameter; and
for at least one item identified in a received product specification data set:
obtain from one or more databases, a plurality of transaction data sets comprised of previously exposed transaction data between buyers and sellers, wherein the transaction data represents market reference price data of a particular period of time, and wherein the transaction data sets are responsive to the at least one item identified in the product specification data set;
adapt the market reference price data by applying one or more pre-defined rules, variables, or criteria operably associated with the item, a parameter of the item, and/or the one or more databases, to the market reference price data, whereby the plurality of transaction data sets are transformed into normalized market price data sets; and
using the normalized market price data sets:
calculate a market value for the at least one item in the product specification data set; and
communicate the calculated market values for the at least one item in the product specification data set to at least one output.

48. The computer-readable storage medium of claim 47, wherein the transaction data includes price data exposed by at least one buyer agent or at least one seller agent.

49. The computer-readable storage medium of claim 48, wherein the transaction data was exposed by a third party.

50. The computer-readable storage medium of claim 47, wherein the at least one item identified in the product specification data set is a combined item that represents a bundled product, a tally, a list, or an assembly of one or more components, and wherein the combined item is offered or sold for a single combined price;

the computer-readable storage medium further comprising instructions that, in response to execution, cause the one or more computing devices to:
calculate, using the normalized market price data, a market value for each component of the combined item;
multiply the calculated market value of each component by a quantity value for each component, thereby generating a market value total for each component; and
sum the market value total for each component of the combined item to generate a combined market value total for the combined item.

51. The computer-readable storage medium of claim 47, wherein at least one parameter identified in the product specification data set or operably associated with at least one item identified in the product specification data set pertains to a grade, a rating measure, a species, an item type, a brand, a quantity, a size, a unit of measure, a tally, a location, a method of delivery, a delivery date, a time of service, a warranty, a payment term, or a transaction type.

52. The computer-readable storage medium of claim 47, further comprising instructions that, in response to execution, cause the one or more computing devices to mathematically normalize data defined by units of measure in the product specification data set and in the market reference price data to standardized or common units of measure.

53. The computer-readable storage medium of claim 47, further comprising instructions that, in response to execution, cause the one or more computing devices to:
update the market value of the at least one item in the product specification data set by obtaining updated transaction data sets from at least one source for the at least one item, wherein the updated transaction data sets represent more-current market reference price data for the at least one item;
adapt the more-current market reference price data by applying the one or more pre-defined rules, variables, or criteria operably associated with the item, a parameter of the item, and/or the one or more databases, to the more-current market reference price data, whereby the additional transaction data sets are transformed into normalized market price data sets; and
using the normalized market price data sets, calculate an updated market value for the at least one item in the product specification data set.

54. The computer-readable storage medium of claim 53, further comprising instructions that, in response to execution, cause the one or more computing devices to automatically update continuously or at a pre-defined time or interval of time, or upon the occurrence of a pre-defined event including a statistical validation failure, or upon agent instruction, the updated market value of at least one item in the product specification data set and to expose the updated market value to at least one other computing device or to communicate the updated market value to one or more recipients.

55. The computer-readable storage medium of claim 47, further comprising instructions that, in response to execution, cause the one or more computing devices to use the calculated market value of the at least one item in the product specification data set, at least in part, to calculate or model a price at which the at least one item is to be sold or offered for sale.

56. The computer-readable storage medium of claim 47, further comprising instructions that, in response to execution, cause the one or more computing devices to use the calculated market value of the at least one item in the product specification data set, at least in part, to calculate, model, or evaluate the price of a bid, an offer, or a contract.

57. A computer-implemented method for evaluating the market value of items, the method comprising:
receiving, by a computer, one or more price data sets, wherein each price data set specifies:
at least one item that is defined by two or more parameters, or a plurality of items that vary in accordance with at least one parameter; and
price data corresponding to the at least one item in the price data set; and
for at least one item identified in a received price data set:
obtaining from one or more databases, a plurality of transaction data sets comprised of previously exposed transaction data between buyers and sellers, wherein the transaction data represents market reference price data of a particular period of time, and wherein the transaction data sets are responsive to the at least one item identified in the price data set;
adapting the market reference price data by applying one or more pre-defined rules, variables, or criteria operably associated with the item, a parameter of the item, and/or the one or more databases, to the market reference price data, whereby the plurality of transaction data sets are transformed into normalized market price data sets; and
using the normalized market price data sets:
calculating a market value for the at least one item in the price data set; and
communicating the calculated market value for the at least one item in the price data set to at least one output.

58. The method of claim 57, wherein the transaction data includes price data exposed by at least one buyer agent or at least one seller agent.

59. The method of claim 58, wherein the transaction data was exposed by a third party.

60. The method of claim 57, further comprising evaluating the price data corresponding to the at least one item in the price data set by comparing the price data to the item's calculated market value.

61. The method of claim 60, further comprising calculating a value of the difference between the price data of the at least one item in the price data set and the item's calculated market value.

62. The method of claim 57, further comprising generating a measure of relative value, wherein the price data of the at least one item in the price data set is divided by the item's calculated market value, producing a ratio or index value.

63. The method of claim 57, wherein the received price data sets include at least one price data set that identifies a plurality of items, wherein a market value total is calculated for the at least one price data set by:
multiplying the calculated market value for each item in the price data set by a specified quantity of the item to produce a market value total for the item; and
summing each item's market value total across the plurality of items in the price data set to produce a market value total for the price data set.

64. The method of claim 57, wherein the received price data sets include at least one price data set that identifies a plurality of items, wherein a price total is calculated for the at least one price data set by:

multiplying the price data for each item in the price data set by a specified quantity of the item to produce a price total for the item; and summing each item's price total across the plurality of items in the price data set to produce a price total for the price data set.

65. The method of claim 63, further comprising comparing two or more received price data sets by their calculated market value total, wherein said comparing includes ranking and/or grouping the two or more price data sets by their calculated market value total.

66. The method of claim 64, further comprising generating a measure of relative value for the price data set by dividing the price total for the price data set by a calculated market value total for the price data set, thereby producing a ratio or index value.

67. The method of claim 57, further comprising receiving a plurality of price data sets that identify the at least one item, and calculating a volume-weighted average price for the item from the price data for the item in the plurality of received price data sets.

68. The method of claim 67, further comprising comparing the calculated average price for the at least one item across the plurality of received price data sets to the calculated market value of the item.

69. The method of claim 68, further comprising quantifying the difference between the calculated average price value for the at least one item and the calculated market value of the at least one item.

70. The method of claim 68, further comprising generating a measure of relative value, wherein the average price for the at least one item is divided by the calculated market value of the at least one item, producing a ratio or index value.

71. The method of claim 70, wherein the ratio of the average price for an item divided by the calculated market value of the item is a measure of relative value of a current time period and is compared to a corresponding measure of relative value representative of a prior period of time or a base period of time.

72. The method of claim 57, further comprising filtering a plurality of price data sets according to one or more parameters or one or more agent-specified criteria, and then ranking or grouping the price data sets by their calculated market value.

73. The method of claim 57, wherein the at least one item identified in the price data set is a combined item that represents a bundled product, a tally, a list, or an assembly of one or more components, and wherein the corresponding price data of the price data set is a single combined price for the combined item;

the method further comprising, using the normalized market price data sets, calculating a market value for each component of the combined item;

multiplying the calculated market value of each component by a quantity value for each component, thereby generating a market value total for each component; and summing the market value total for each component of the combined item to generate a combined market value total for the combined item.

74. The method of claim 57, wherein at least one parameter identified in the price data set or operably associated with at least one item in the price data set pertains to a grade, a rating measure, a species, an item type, a brand, a quantity, a size, a unit of measure, a tally, a location, a method of delivery, a delivery date, a time of service, a warranty, a payment term, or a transaction type.

75. The method of claim 74, wherein the delivery date or time of service includes a forward price with one or more delivery or service dates in the future.

76. The method of claim 74, wherein delivery comprises a financial delivery.

77. The method of claim 74, wherein the payment term includes a term of credit.

78. The method of claim 57, wherein a price in a price data set specifies a price that is defined as a formula and/or derived from one or more prices to be calculated or reported at one or more periods of time in the future.

79. The method of claim 78, wherein a price defined as a formula is a metric value to be calculated using normalized market price data of a specified period of time, and wherein the calculated metric value is a volume-weighted average price for the at least one item in the price data set, or a formula-defined increment thereof.

80. The method of claim 78, further comprising defining the one or more databases and/or the one or more periods of time when the market value is to be calculated or communicated.

81. The method of claim 57, wherein the at least one item in the price data set represents a physical product, a raw material, an intangible product, a service, or a combination thereof.

82. The method of claim 57, wherein the at least one item for which market reference price data is obtained has one or more specified units of measure, the method further comprising verifying that the one or more units of measure are equal to corresponding units of measure as specified for the item in the price data set, and if not equal, mathematically converting the market reference price data according to the corresponding units of measure.

83. The method of claim 57, further comprising mathematically normalizing data defined by units of measure in the price data set and in the market reference price data to standardized or common units of measure.

84. The method of claim 57, wherein the market reference price data is indicative of a current market price for the at least one item in the price data set.

85. The method of claim 57, wherein the market reference price data is indicative of a market price for the at least one item in the price data set over a specified period of time.

86. The method of claim 57, further comprising filtering the normalized market reference price data according to one or more parameters or one or more agent-specified criteria before calculating the market value for the at least one item in the price data set.

87. The method of claim 86, wherein the calculated market value represents market reference data that is generated by one or more pre-selected sources of the transaction data sets.

88. The method of claim 57, further comprising excluding at least a portion of the transaction data or the normalized market price data for failure to meet a predetermined statistical criterion or a validation rule.

89. The method of claim 57, further comprising limiting the transaction data in a transaction data set to data from transactions that resulted in a purchase.

90. The method of claim 57, wherein transaction data is obtained from at least one external database.

91. The method of claim 57, wherein transaction data stored in at least one of the one or more databases is obtained from multiple sources.

92. The method of claim 57, further comprising receiving instructions from an agent, wherein the instructions are associated with the at least one item in the price data set, and wherein the instructions indicate selection of an alternate item, an alternate parameter, another database for obtaining a transaction data set, or an alternate third-party source from which to obtain at least one independently reported market value for the at least one item in the price data set.

93. The method of claim 57, wherein the transaction data sets responsive to the at least one item in the price data set includes only transaction data exposed in response to a specific inquiry or event and over the same period of time.

94. The method of claim 57, wherein the at least one item in the price data set, or at least one parameter identified in the price data set or in a transaction data set, is operably associated with one or more pre-defined rules, variables, or criteria for adapting and managing metric data, wherein such operable association is static and automatically applied or dynamic and conditionally applied.

95. The method of claim 94, wherein the rules, variables, or criteria are pre-defined by at least one agent and apply when the at least one agent provides or receives a price data set containing one or more items for market valuation.

96. The method of claim 94, wherein at least one responsive transaction data set has one or more parameters that vary from the price data set, wherein one or more of the pre-defined rules, variables, or criteria causes an adjustment value to be calculated and applied to the transaction data in the transaction data set with the one or more varying parameters.

97. The method of claim 57, further comprising:
obtaining exposed transaction data for an alternate item, wherein the transaction data represents market reference price data for the alternate item, and wherein the alternate item is a substitute item or an item with at least one differing parameter value from that of the at least one item in the price data set;
adapting the market reference price data for the alternate item by applying one or more pre-defined rules, variables, or criteria operably associated with the item, a parameter of the item, and/or the one or more databases, to the market reference price data, whereby the transaction data is transformed into normalized market price data; and
using the normalized market price data for the alternate item, calculating a market value for the alternate item for comparison to the market value of the at least one item in the price data set.

98. The method of claim 57, wherein the market value of the at least one item in the price data set is derived by a formula, a rule, or a correlation from the market value of the alternate item that is a substitute for the at least one item in the price data set.

99. The method of claim 57, further comprising calculating a market value for the at least one item in the price data set, wherein the calculated market value is exposed to at least one other computing device.

100. The method of claim 57, further comprising:
updating the market value of the at least one item in the price data set by obtaining updated transaction data sets from at least one source for the at least one item, wherein the updated transaction data sets represent more-current market reference price data for the at least one item;
adapting the more-current market reference price data by applying the one or more pre-defined rules, variables, or criteria operably associated with the item, a parameter of the item, and/or the one or more databases, to the more-current market reference price data, whereby the plurality of additional transaction data sets are transformed into normalized market price data sets; and
using the normalized market price data sets, calculating an updated market value for the at least one item in the price data set.

101. The method of claim 100, wherein the market value of the at least one item in the price data set is automatically updated continuously or at a pre-configured time or interval of time, or upon the occurrence of a pre-defined event including a statistical validation failure, or upon agent instruction.

102. The method of claim 100, wherein updating the market value for the at least one item occurs in near real-time.

103. The method of claim 57, further comprising using the calculated market value of the at least one item in the price data set, at least in part, to calculate or model a price at which the at least one item is to be sold or offered for sale.

104. The method of claim 57, further comprising using the calculated market value of the at least one item in the price data set, at least in part, to calculate, model, or evaluate the price of a bid, an offer, or a contract.

105. The method of claim 57, wherein the price data set includes a quantity value for the at least one item, wherein the normalized market price data comprises a comparable price per unit for the at least one item, and wherein calculating a market value for the at least one item comprises multiplying the comparable price per unit by the quantity value for the at least one item.

106. The method of claim 57, further comprising generating an output that reports the calculated market value of the at least one item in the price data set to one or more recipients.

107. The method of claim 57, wherein calculating a market value using the normalized market price data includes mathematically calculating a volume-weighted average price for the at least one item in the price data set.

108. The method of claim 57, wherein calculating a market value using the normalized price data includes applying at least one algorithm that incorporates a replicable mathematical process for calculating at least one market value from a plurality of normalized values, including a mean value, a median value, or variation of a mean or median value.

109. The method of claim 100, further comprising comparing the updated market value for the at least one item in the price data set to a corresponding prior market value, base market value, or third-party reported market value for the at least one item, and communicating the comparison to the at least one output.

110. The method of claim 109, wherein said comparing includes generating a measure of relative value by dividing the updated market value by the corresponding prior market value, base market value, or third-party reported market value for the at least one item in the price data set, producing a ratio or index value.

111. The method of claim 109, further comprising calculating a value of a change in market value of the at least one item in the price data set from the corresponding prior market value, base market value, or third-party reported market value, for the at least one item in the price data set, and generating a comparison value by dividing the value of the change by the prior market value, base market value, or third-party reported market value.

112. The method of claim 109, wherein comparing the updated market value to a prior market value, base market value, or third-party reported market value includes generating one or more visual representations in the form of a table, chart, or graph.

113. The method of claim 112, wherein the one or more visual representations are expandable to expose calculation detail or additional linked information.

114. The method of claim 100, further comprising using the updated market value of the at least one item in the price data set to:
  identify one or more offers-to-sell the at least one item below its updated market value and/or one or more offers-to-buy the at least one item above its updated market value; or
  value the spread between the bid and offer price data for the at least one item across the plurality of normalized market price data sets to determine whether the value of the spread in the normalized market price data sets and the updated market value for the at least one item meet pre-defined criteria for an arbitrage transaction.

115. A non-transitory, computer-readable storage medium having computer-executable instructions stored thereon, wherein the instructions, in response to execution by one or more computing devices, cause the one or more computing devices to:
  receive one or more price data sets, wherein each price data set specifies:
    at least one item that is defined by two or more parameters, or a plurality of items that vary in accordance with at least one parameter; and
    price data corresponding to the item or items in the price data sets; and
  for at least one item identified in a received price data set:
    obtain from one or more databases, a plurality of transaction data sets comprised of previously exposed transaction data between buyers and sellers, wherein the transaction data represents market reference price data of a particular period of time, and wherein the transaction data sets are responsive to the at least one item in the price data set;
    adapt the market reference price data by applying one or more pre-defined rules, variables, or criteria operably associated with the item, a parameter of the item, and/or the one or more databases, to the market reference price data, whereby the plurality of transaction data sets are transformed into normalized market price data sets; and
    using the normalized market price data sets:
      calculate a market value for the at least one item in the price data set; and
      communicate the calculated market value for the at least one item to at least one output.

116. The computer-readable storage medium of claim 115, wherein the transaction data includes price data exposed by at least one buyer agent or at least one seller agent.

117. The computer-readable storage medium of claim 116, wherein the transaction data was exposed by a third party.

118. The computer-readable storage medium of claim 115, wherein the at least one item in the price data set is a combined item that represents a bundled product, a tally, a list, or an assembly of one or more components, and wherein the combined item is offered or sold for a single combined price;
  the computer-readable storage medium further comprising instructions that, in response to execution, cause the one or more computing devices to:
    calculate, using the normalized market price data sets, a market value for each component of the combined item;
    multiply the calculated market value of each component by a quantity value for each component, thereby generating a market value total for each component; and
    sum the market value total for each component of the combined item in the price data set to generate a combined market value total for the combined item.

119. The computer-readable storage medium of claim 115, wherein at least one parameter identified in the price data set or operably associated with the at least one item identified in the price data set pertains to a grade, a rating measure, a species, an item type, a brand, a quantity, a size, a unit of measure, a tally, a location, a method of delivery, a delivery date, a time of service, a warranty, a payment term, or a transaction type.

120. The computer-readable storage medium of claim 115, further comprising instructions that, in response to execution, cause the one or more computing devices to mathematically normalize data defined by units of measure data in the price data set and in the market reference price data to standardized or common units of measure.

121. The computer-readable storage medium of claim 115, further comprising instructions that, in response to execution, cause the one or more computing devices to:
  update the market value of the at least one item in the price data set by obtaining updated transaction data sets from at least one source for the at least one item, wherein the transaction data in the updated transaction data sets represents more-current market reference price data for the at least one item;
  adapt the more-current market reference price data by applying the one or more pre-defined rules, variables, or criteria operably associated with the item, a parameter of the item, and/or the one or more databases, to the more-current market reference price data, whereby the transaction data sets are transformed into normalized market price data sets; and
  using the normalized market price data sets, calculate an updated market value for the at least one item in the price data set.

122. The computer-readable storage medium of claim 115, further comprising instructions that cause the one or more computing devices to use the calculated market value of the at least one item in the price data set, at least in part, to calculate or model a price at which the at least one item is to be sold or offered for sale.

123. The computer-readable storage medium of claim 115, further comprising instructions that, in response to execution, cause the one or more computing devices to use the calculated market value of the at least one item in the price data set, at least in part, to calculate, model, or evaluate the price of a bid, an offer, or a contract.

124. A computer-implemented method for evaluating price data, the method comprising:
  receiving, by a computer, one or more product specification data sets that identify at least one item that is defined by two or more parameters, or a plurality of items that differ in accordance with at least one parameter;
  receiving, by a computer, one or more price data sets, wherein each price data set identifies one or more items and corresponding price data that are responsive to one or more of the items in the product specification data sets; and
  for at least one item identified in a received product specification data set and at least one item identified in a received price data set that is responsive to the at least one item in the product specification data set:
    obtaining from one or more databases, a plurality of transaction data sets comprised of previously exposed transaction data between buyers and sellers, wherein the transaction data represents market reference price data of a particular period of time, and wherein the transaction data sets are responsive to the at least one item in the product specification data set and the at least one item in the price data set; and adapting the market reference price data by applying one or more pre-defined rules, variables, or criteria operably associated with the item, a parameter of the item, and/or the one or more databases, to the market reference price data, whereby the plurality of transaction data sets are transformed into normalized market price data sets; and using the normalized market price data sets:

calculating a market value for the at least one item in the product specification data set and/or calculating a market value for the at least one item in the price data set;

comparing the calculated market value of:

the at least one item in the product specification data set with the calculated market value of the at least one item in the price data set; or the at least one item in the product specification data set with the corresponding price data of the at least one item in the price data set; or the at least one item in the price data set with the corresponding price data of the at least one item in the price data set; and communicating the comparison to at least one output.

125. The method of claim 124, wherein the transaction data includes price data exposed by at least one buyer agent or at least one seller agent.

126. The method of claim 125, wherein the transaction data was exposed by a third party.

127. The method of claim 124, further comprising evaluating the price data of the at least one item in the price data set by comparing the corresponding price data to the at least one item's calculated market value.

128. The method of claim 124, further comprising comparing the corresponding price data for the at least one item in two or more of the received price data sets, wherein said comparing includes ranking and/or grouping the two or more price data sets by the calculated market value of the at least one item.

129. The method of claim 124, further comprising calculating a market value total for at least one product specification data set and/or at least one price data set that identifies a plurality of items by:

multiplying the calculated market value for each item in the data set by a specified quantity of the item to produce a market value total for the item; and summing each item's market value total across the plurality of items in the data set to produce a market value total for the data set.

130. The method of claim 124, wherein the received price data sets include at least one price data set that identifies a plurality of items, and wherein a price total is calculated for the at least one price data set by:

multiplying the corresponding price data for each item in the price data set by a specified quantity of the item to produce a price total for the item; and summing each item's price total across the plurality of items in the price data set to produce a price total for the price data set.

131. The method of claim 124, further comprising comparing two or more price data sets by the calculated market value of the at least one item in the two or more price data sets, wherein said comparing includes ranking and/or grouping the two or more price data sets by the calculated market value of the at least one item.

132. The method of claim 124, further comprising generating a measure of relative value by dividing the corresponding price data for at least one item in the product specification data set or in the price data set by the calculated market value for the at least one item, producing a ratio or index value.

133. The method of claim 132, further comprising comparing two or more of the price data sets, wherein at least one price data set includes an alternate or substitute item or varies by one or more parameter values from the product specification product set or another price data set, wherein said comparing includes ranking or grouping the price data sets by the measure of relative value for each price data set, expressed as the ratio or index value.

134. The method of claim 124, further comprising filtering two or more of the price data sets by one or more parameters or one or more agent-specified criteria, and ranking or grouping the filtered price data sets by the calculated market value of the at least one item in the price data sets.

135. The method of claim 124, further comprising receiving a plurality of price data sets that identify at least one item, and calculating a volume-weighted average price for the at least one item across the plurality of price data sets.

136. The method of claim 135, further comprising comparing the calculated average price for the at least one item in the plurality of price data sets to the calculated market value of the at least one item in the product specification data set.

137. The method of claim 136, further comprising quantifying the difference in value between the calculated average price for the at least one item in the plurality of price data sets and the calculated market value of the at least one item in the product specification data set.

138. The method of claim 136, further comprising generating a measure of relative value, wherein the average price for the at least one item in the plurality of price data sets is divided by the calculated market value of the at least one item in the product specification data set, producing a ratio or index value.

139. The method of claim 138, wherein the generated measure of relative value is compared to a corresponding measure of relative value for the at least one item at a prior period of time or a base period of time.

140. The method of claim 124, wherein the at least one item in the product specification data set or the at least one item in the price data set is a combined item that represents a bundled product, a tally, a list, or an assembly of one or more components, and wherein the combined item is offered or sold for a single combined price;

the method further comprising using the normalized market price data sets, calculating a market value for each component of the combined item in the product specification data set or the price data set;

multiplying the calculated market value of each component by a quantity value for each component, thereby generating a market value total for each component; and summing the market value total for each component of the combined item to generate a combined market value total for the combined item in the product specification data set or the price data set.

141. The method of claim 124, wherein at least one parameter identified in the product specification data set or the price data set, or operably associated with at least one item in the product specification data set or the price data set, pertains to a grade, a rating measure, a species, an item type, a brand, a quantity, a size, a unit of measure, a tally, a location, a method of delivery, a delivery date, a time of service, a warranty, a payment term, or a transaction type.

142. The method of claim 141, wherein the delivery date or time of service includes a forward price with one or more delivery or service dates in the future.

143. The method of claim 142, wherein delivery comprises a financial delivery.

144. The method of claim 141, wherein the payment term includes a term of credit.

145. The method of claim 124, wherein the item specification in at least one received product specification data set and/or the corresponding price data in at least one received price data set identifies a price that is defined as a formula and/or derived from one or more prices to be calculated or reported at one or more periods of time in the future.

146. The method of claim 145, wherein a price defined as a formula is a metric value to be calculated using normalized market price data of a specified time period, and wherein the calculated metric value is a volume-weighted average price for at least one item in the price data set or a formula-defined increment thereof.

147. The method of claim 145, further comprising defining the one or more databases and/or one or more periods of time when the market value is to be calculated or communicated.

148. The method of claim 124, wherein the at least one item identified in the product specification data set represents a physical product, a raw material, an intangible product, a service, or a combination thereof.

149. The method of claim 124, wherein the at least one item for which market reference price data is obtained has one or more specified units of measure, the method further comprising verifying that the one or more units of measure are equal to corresponding units of measure specified for the item in the price data set, and if not equal, mathematically converting the market reference price data according to the corresponding units of measure.

150. The method of claim 124, further comprising mathematically normalizing data defined by units of measure data in the product specification data set, the price data set, and the market reference price data sets, to standardized or common units of measure.

151. The method of claim 124, wherein the plurality of transaction data sets responsive to the at least one item in the product specification data set or the at least one item in the price data set includes only transaction data exposed in response to a specific inquiry or event and over the same period of time.

152. The method of claim 124, wherein the market reference price data is indicative of a current market price for the at least one item in the price data set or the product specification data set.

153. The method of claim 124, wherein the market reference price data is indicative of a market price for the at least one item in the price data set or the product specification data set over a specified period of time.

154. The method of claim 124, further comprising filtering the normalized market reference price data according to one or more parameters or one or more agent-specified criteria before calculating the market value for the at least one item in the price data set and/or in the product specification data set.

155. The method of claim 154, wherein the calculated market value represents market reference data that is generated by one or more sources of the transaction data sets.

156. The method of claim 124, wherein transaction data is obtained from at least one external database.

157. The method of claim 124, wherein transaction data is obtained from multiple sources.

158. The method of claim 124, further comprising:
obtaining exposed transaction data for an alternate item, wherein the transaction data represents market reference price data for the alternate item, and wherein the alternate item is a substitute item or an item with at least one differing parameter value from that of the at least one item in the price data set or the product specification data set;
adapting the market reference price data for the alternate item by applying one or more pre-defined rules, variables, or criteria operably associated with the item, a parameter of the item, and/or the one or more databases, to the market reference price data, whereby the transaction data is transformed into normalized market price data; and
using the normalized market price data for the alternate item, calculating a market value for the alternate item for comparison to the market value of the at least one item in the price data set or the product specification data set.

159. The method of claim 158, wherein the market value of the at least one item in the price data set or the product specification data set is derived by a formula, a rule, or a correlation from the market value of the alternate item that is a substitute for the at least one item in the price data set or the product specification data set.

160. The method of claim 124, further comprising calculating a market value for each of the items in the product specification data set and/or the price data set, wherein the calculated market value of the items is exposed to at least one other computing device.

161. The method of claim 124, further comprising:
updating the market value of the at least one item in the price data set and/or the product specification data set by obtaining updated transaction data sets from at least one source for the at least one item, wherein the updated transaction data sets represent more-current market reference price data for the at least one item;
adapting the more-current market reference price data by applying the one or more pre-defined rules, variables, or criteria operably associated with the item, a parameter of the item, and/or the one or more databases, to the more-current market reference price data, whereby the additional transaction data sets are transformed into normalized market price data sets; and
using the normalized market price data sets, calculating an updated market value for the at least one item in the product specification data set and/or the price data set.

162. The method of claim 161, wherein the market value of the at least one item in the price data set and/or the product specification data set is automatically updated continuously or at a pre-configured time or interval of time, or upon the occurrence of a pre-defined event including a statistical validation failure, or upon agent instruction.

163. The method of claim 161, wherein updating the market value for the at least one item occurs in near real-time.

164. The method of claim 124, wherein the price data set and/or the product specification data set includes a quantity value for at least one item, wherein the normalized market price data comprises a comparable price per unit for the at least one item, and wherein calculating a market value for the at least one item comprises multiplying the comparable price per unit by the quantity value for the at least one item.

165. The method of claim 124, wherein calculating a market value using the normalized market reference price data includes mathematically calculating a volume-weighted average price for the at least one item in the price data set and/or the product specification data set.

166. The method of claim 124, wherein calculating a market value using the normalized market reference price data includes applying at least one algorithm that incorporates a replicable mathematical process for calculating at least one market value from a plurality of normalized values, including a mean value, a median value, or variation of a mean or median value.

167. The method of claim 124, further comprising excluding at least a portion of the transaction data or the normalized market price data for failure to meet a predetermined statistical criterion or a validation rule.

168. The method of claim 124, further comprising limiting the transaction data in a transaction data set to data from transactions that resulted in a purchase.

169. The method of claim 124, further comprising receiving from a buyer-agent a buy notice and/or purchase order with respect to at least one item in at least one price data set responsive to the item in the product specification data set, and transmitting the buy notice and/or a purchase order to the seller agent from whom the at least one price data set was received.

170. A non-transitory computer-readable storage medium having computer-executable instructions stored thereon, wherein the instructions, in response to execution by one or more computing devices, cause the one or more computing devices to:
  receive one or more product specification data sets that identify at least one item that is defined by two or more parameters, or a plurality of items that differ in accordance with at least one parameter;
  receive one or more price data sets, wherein each price data set identifies one or more items and corresponding price data that are responsive to one or more of the items in the product specification data sets; and
  for at least one item identified in a received product specification data set and at least one item identified in a received price data set that is responsive to the at least one item in the product specification data set:
    obtain from one or more databases, a plurality of transaction data sets comprised of previously exposed transaction data between buyers and sellers, wherein the transaction data represents market reference price data of a particular period of time, and wherein the transaction data sets are responsive to the at least one item in the product specification data set and the at least one item in the price data set;
    adapt the market reference price data by applying one or more pre-defined rules, variables, or criteria operably associated with the item, a parameter of the item, and/or the one or more databases, to the market reference price data, whereby the plurality of transaction data sets are transformed into normalized market price data sets; and
    using the normalized market price data sets:
      calculate a market value for the at least one item in the product specification data set and/or calculate a market value for the at least one item in the price data set;
      compare the calculated market value of:
        the at least one item in the product specification data set with the calculated market value of the at least one item in the price data set; or
        the at least one item in the product specification data set with the corresponding price data of the at least one item in the price data set; or
        the at least one item in the price data set with the corresponding price data of the at least one item in the price data set; and
      communicate the comparison to at least one output.

171. The computer-readable storage medium of claim 170, wherein the transaction data includes price data exposed by at least one buyer agent or at least one seller agent.

172. The computer-readable storage medium of claim 171, wherein the transaction data was exposed by a third party.

173. The computer-readable storage medium of claim 170, further comprising instructions that, in response to execution, cause the one or more computing devices to calculate a market value total for at least one received product specification data set and/or at least one received price data set that identifies a plurality of items by:
  multiplying the calculated market value for each item in the data set by a specified quantity of the item to produce a market value total for the item; and
  summing each item's market value total across the plurality of items in the data set to produce a market value total for the data set.

174. The computer-readable storage medium of claim 170, further comprising instructions that, in response to execution, cause the one or more computing devices to compare two or more price data sets by the calculated market value of the at least one item in the two or more price data sets, wherein the comparison includes ranking and/or grouping the two or more price data sets by the calculated market value of the at least one item.

175. The computer-readable storage medium of claim 170, further comprising instructions that, in response to execution, cause the one or more computing devices to generate a measure of relative value by dividing the corresponding price data for at least one item in the product specification data set or in the price data set by the calculated market value of the at least one item, producing a ratio or index value.

176. The computer-readable storage medium of claim 170, wherein at least one parameter identified in the product specification data set or the price data set, or operably associated with at least one item in the product specification data set or the price data set, pertains to a grade, a rating measure, a species, an item type, a brand, a quantity, a size, a unit of measure, a tally, a location, a method of delivery, a delivery date, a time of service, a warranty, a payment term, or a transaction type.

177. The computer-readable storage medium of claim 170, wherein at least one item in the product specification data set or the price data set is a combined item that represents a bundled product, a tally, a list, or an assembly of components, and wherein the combined item is offered or sold for a single combined price;
  using the normalized market price data sets, calculate a market value for each component of the combined item;
  multiply the calculated market value of each component by a quantity value for each component, thereby generating a market value total for each component; and
  sum the market value total for each component of the combined item to generate a combined market value total for the combined item.

178. The computer-readable storage medium of claim 170, further comprising instructions that, in response to execution, cause the one or more computing devices to update the market value of the at least one item in the product specification data set and/or the price data set by obtaining updated transaction data sets from at least one source for the at least one item, wherein the updated transaction data sets represent more-current market reference price data for the at least one item;

adapting the more-current market reference price data by applying the one or more pre-defined rules, variables, or criteria operably associated with the item, a parameter of the item, and/or the one or more databases, to the more-current market reference price data, whereby the additional transaction data sets are transformed into normalized market price data sets; and using the normalized market price data sets, calculating an updated market value for the at least one item in the product specification data set and/or the price data set.

179. The computer-readable storage medium of claim 170, further comprising instructions that, in response to execution, cause the one or more computing devices to mathematically normalize data defined by units of measure in the product specification data set, the price data set, and in the market reference price data to standardized or common units of measure.

180. The computer-readable storage medium of claim 170, wherein at least one item in at least one price data set is identified for purchase based, at least in part, on the item's calculated market value.

181. The computer-readable storage medium of claim 175, wherein subject to business rules, the price data set having the lowest calculated relative value for the at least one item is identified for a purchase, and a buy-notice or a purchase order is communicated to a seller agent from whom the price data set was received.

182. The method of claim 1, wherein the calculated market value is a metric value that provides market information and is not an actionable bid or offer.

183. The method of claim 1, further comprising, before calculating the market value for the at least one item in the product specification data set, validating the normalized market reference price data against pre-defined rules and criterion that include the date/time of transaction data exposure and/or the date/time of the corresponding transaction, and/or total volume in units per item, and/or frequency/liquidity of the transaction data, and/or concentration/fragmentation of the transaction data by source of the transaction data, and/or concentration/fragmentation of the transaction data by the type of transaction.

184. The method of claim 1, wherein calculating the market value for the at least one item in the product specification data set includes statistically validating the calculated market value by measuring a deviation of the calculated market value from a prior or base market value, wherein exceeding a pre-defined threshold or value of change from the prior or base market value causes a re-calculation of the market value and/or flagging of the calculated market value as falling outside a pre-defined deviation or value of change.

185. The method of claim 26, wherein the one or more pre-defined rules, variables, or criteria operably associated with the at least one item in the product specification data set causes the adjustment value to be applied to the transaction data set with the varying parameter, wherein the adjustment value is calculated for each varying parameter, wherein the adjustment value serves to minimize a difference between the transaction data set with the varying parameter and an average of all responsive transaction data sets over a defined period of time, or an average of a control group of transaction data sets over a defined period of time, wherein the adjustment value is determined by applying a least squares or similar curve-fit algorithm.

186. The method of claim 30, wherein updating the market value of the at least one item in the product specification data set includes dynamically adding at least one additional or more-current transaction data set, or excluding or not obtaining at least one transaction data set that is no longer responsive to the at least one item in the product specification data set or no longer represents market reference price data of a specified period of time, wherein the period of time specification can include an updated period of time specification.

187. The method of claim 1, wherein the normalized market price data sets include at least one compound or multi-variant market price data set generated by operably associating the at least one item in the product specification data set, a parameter, or a database with one or more other items, parameters, or databases, and/or conditionally associating the at least one item, the parameter or the database with one or more other pre-defined rules, variables, or criteria.

188. The method of claim 1, wherein the one or more pre-defined rules, variables, or criteria include:
one or more formulas operationally combining elements and using variables relating to a plurality of items, parameters, and/or databases;
a combination of rules, variables, or criteria relating to a plurality of items, parameters, and/or databases, the application of which may be conditional, hierarchical, or priority weighted; or
validation rules or criteria relating to a plurality of items, parameters, and/or databases, the application of which may be conditional, hierarchical, or priority weighted.

189. The computer-readable storage medium of claim 47, further comprising instructions that, in response to execution, cause the one or more computing devices to operably associate the at least one item in the product specification data set, or at least one parameter identified in the product specification data set or in a transaction data set, with one or more pre-defined rules, variables, or criteria for adapting and managing metric data, wherein such operable association is static and automatically applied or dynamic and conditionally applied.

190. The computer-readable storage medium of claim 47, further comprising instructions that, in response to execution, cause the one or more computing devices to apply one or more of the pre-defined rules, variables, or criteria and cause an adjustment value to be calculated and applied to the transaction data in at least one responsive transaction data set with one or more parameters that vary from the parameters of the product specification data set.

191. The computer-readable storage medium of claim 47, further comprising instructions that, in response to execution, cause the one or more computing devices to validate the normalized market reference price data against pre-defined rules and criterion that include the date/time of transaction data exposure and/or the date/time of the corresponding transaction, and/or total volume in units per item, and/or frequency/liquidity of the transaction data, and/or concentration/fragmentation of the transaction data by source of the transaction data, and/or concentration/fragmentation of the transaction data by the type of transaction, before calculating the market value for the at least one item in the product specification data set.

192. The computer-readable storage medium of claim 47, further comprising instructions that, in response to execution, cause the one or more computing devices to statistically validate the calculated market value for the at least one item in the product specification data set by measuring a deviation of the calculated market value from a prior or base market value, wherein exceeding a pre-defined threshold or value of change from the prior or base market value causes a re-calculation of the market value and/or flagging of the calculated market value as falling outside a pre-defined deviation or value of change.

193. The computer-readable storage medium of claim 190, further comprising instructions that, in response to execution, cause the one or more computing devices to apply the adjustment value to the transaction data set with the varying parameter, wherein the adjustment value is calculated for each varying parameter, wherein the adjustment value serves to minimize a difference between the transaction data set with the varying parameter and an average of all responsive transaction data sets over a defined period of time, or an average of a control group of transaction data sets over a defined period of time, wherein the adjustment value is determined by applying a least squares or similar curve-fit algorithm.

194. The computer-readable storage medium of claim 47, further comprising instructions that, in response to execution, cause the one or more computing devices to apply one or more pre-defined rules, variables, or criteria including:
   one or more formulas operationally combining elements and using variables relating to a plurality of items, parameters, and/or databases;
   a combination of rules, variables, or criteria relating to a plurality of items, parameters, and/or databases, the application of which may be conditional, hierarchical, or priority weighted; or
   validation rules or criteria relating to a plurality of items, parameters, and/or databases, the application of which may be conditional, hierarchical, or priority weighted.

195. The computer-readable storage medium of claim 47, further comprising instructions that, in response to execution, cause the one or more computing devices to operably associate the at least one item in the product specification data set, a parameter, or a database with one or more other items, parameters, or databases, and/or conditionally associate the at least one item, the parameter or the database with one or more pre-defined rules, variables, or criteria, producing at least one compound or multi-variant market price data set within the plurality of normalized market price data sets.

196. The method of claim 57, wherein the calculated market value is a metric value that provides market information and is not an actionable bid or offer.

197. The method of claim 57, further comprising, before calculating the market value for the at least one item in the price data set, validating the normalized market reference price data against pre-defined rules and criterion that include the date/time of transaction data exposure and/or the date/time of the corresponding transaction, and/or total volume in units per item, and/or frequency/liquidity of the transaction data, and/or concentration/fragmentation of the transaction data by source of the transaction data, and/or concentration/fragmentation of the transaction data by the type of transaction.

198. The method of claim 57, wherein calculating the market value for the at least one item in the price data set includes statistically validating the calculated market value by measuring a deviation of the calculated market value from a prior or base market value, wherein exceeding a pre-defined threshold or value of change from the prior or base market value causes a re-calculation of the market value and/or flagging of the calculated market value as falling outside a pre-defined deviation or value of change.

199. The method of claim 96, wherein the one or more pre-defined rules, variables, or criteria operably associated with the at least one item in the price data set causes the adjustment value to be applied to the transaction data set with the varying parameter, wherein the adjustment value is calculated for each varying parameter, wherein the adjustment value serves to minimize a difference between the transaction data set with the varying parameter and the average of all responsive transaction data sets over a defined period of time, or an average of a control group of transaction data sets over a defined period of time, wherein the adjustment value is determined by applying a least squares or similar curve-fit algorithm.

200. The method of claim 57, wherein the normalized market price data sets include at least one compound or multi-variant market price data set generated by operably associating the at least one item in the price data set, a parameter, or a database, with one or more other items, parameters, or databases, and/or conditionally associating the at least one item, the parameter or the database with one or more other pre-defined rules, variables, or criteria.

201. The method of claim 57, wherein the one or more pre-defined rules, variables, or criteria include:
   one or more formulas operationally combining elements and using variables relating to a plurality of items, parameters, and/or databases; and/or
   a combination of rules, variables, or criteria relating to a plurality of items, parameters, and/or databases, the application of which may be conditional, hierarchical, or priority weighted; and/or
   validation rules or criteria relating to a plurality of items, parameters, and/or databases, the application of which may be conditional, hierarchical, or priority weighted.

202. The method of claim 100, wherein updating the market value of the at least one item in the product specification data set includes dynamically adding at least one additional or more-current transaction data set, or excluding or not obtaining at least one transaction data that is no longer responsive to the at least one item in the price data set or no longer representing market reference price data of a specified period of time, wherein the period of time specification can include an updated period of time specification.

203. The method of claim 66, further comprising receiving a plurality of price data sets, wherein at least one price data set varies by one or more parameter values from the parameters of at least one other price data set, and ranking or grouping the price data sets by the generated measure of relative value of each price data set.

204. The computer-readable storage medium of claim 115, further comprising instructions that, in response to execution, cause the one or more computing devices to operably associate the at least one item identified in the price data set with one or more rules, variables, or criteria for adapting and managing metric data, wherein such operable association is static and automatically applied or dynamic and conditionally applied.

205. The computer-readable storage medium of claim 115, further comprising instructions that, in response to execution, cause the one or more computing devices to apply one or more of the pre-defined rules, variables, or criteria and cause an adjustment value to be calculated and applied to at least one responsive transaction data set with one or more parameters that vary from the parameters of the price data set.

206. The computer-readable storage medium of claim 115, further comprising instructions that, in response to execution, cause the one or more computing devices to validate the normalized market reference price data against pre-defined rules and criterion that include the date/time of transaction data exposure and/or the date/time of the corresponding transaction, and/or total volume in units per item, and/or frequency/liquidity of the transaction data, and/or concentration/fragmentation of the transaction data by source of the transaction data, and/or concentration/fragmentation of the transaction data by the type of transaction, before calculating the market value for the at least one item in the price data set.

207. The computer-readable storage medium of claim 115, further comprising instructions that, in response to execution, cause the one or more computing devices to statistically validate the calculated market value for at least one item in the price data set by measuring a deviation of the calculated market value from a prior or base market value, wherein exceeding a pre-defined threshold or value of change from the prior or base market value causes a re-calculation of the market value and/or flagging of the calculated market value as falling outside a pre-defined deviation or value of change.

208. The computer-readable storage medium of claim 205, further comprising instructions that, in response to execution, cause an adjustment value to be applied to the transaction data set with the varying parameter, wherein the adjustment value is calculated for each varying parameter, wherein the adjustment value serves to minimize a difference between the transaction data set with the varying parameter and the average of all responsive transaction data sets over a defined period of time, or an average of a control group of transaction data sets over a defined period of time, wherein the adjustment value is determined by applying a least squares or similar curve-fit algorithm.

209. The computer-readable storage medium of claim 115, further comprising instructions that, in response to execution, cause the one or more computing devices to apply one or more pre-defined rules, variables, or criteria including:
one or more formulas operationally combining elements and using variables relating to a plurality of items, parameters, and/or databases; and/or
a combination of rules, variables, or criteria relating to a plurality of items, and/or parameters, and/or databases, the application of which may be conditional, hierarchical, or priority weighted; and/or
validation rules or criteria relating to a plurality of items, and/or parameters, and/or databases, the application of which may be conditional, hierarchical, or priority weighted.

210. The computer-readable storage medium of claim 115, further comprising instructions that, in response to execution, cause the one or more computing devices to operably associate the at least one item in the product specification data set, a parameter, or a database with one or more other items, parameters, or databases, and/or conditionally associating the at least one item, the parameter or the database with one or more other pre-defined rules, variables, or criteria, producing at least one compound or multi-variant market price data set within the plurality of normalized market price data sets.

211. The computer-readable storage medium of claim 121, further comprising instructions that, in response to execution, cause the one or more computing devices to use the updated market values of the one or more items identified in the price data set to:
identify one or more offers-to-sell the at least one item below its updated market value and/or one or more offers-to-buy the at least one item above its updated market value; or
value the spread between the bid and offer price data for the at least one item across the plurality of normalized market price data sets to identify whether the value of the spread in the normalized market price data sets and the updated market value for the at least one item meet pre-defined criteria for an arbitrage transaction.

212. The method of claim 124, wherein the at least one item identified in the product specification data set or the price data set, or at least one parameter identified in the product specification data set, a responsive price data set, or in an obtained transaction data set, is operably associated with one or more pre-defined rules, variables, or criteria for adapting and managing metric data, wherein such operable association is static and automatically applied or dynamic and conditionally applied.

213. The method of claim 124, wherein the rules, variables, or criteria are pre-defined by at least one agent and apply when the at least one agent provides a product specification data set for market valuation or receives a price data set containing one or more items.

214. The method of claim 124, wherein at least one responsive transaction data set has one or more parameters that vary from the product specification data set or the price data set, and wherein at least one pre-defined rule, variable, or criteria causes an adjustment value to be calculated and applied to the transaction data in the transaction data set with the varying parameter.

215. The method of claim 124, further comprising, before calculating the market value for the at least one item in the product specification data set and/or the price data set, validating the normalized market reference price data against pre-defined rules and criterion that include the date/time of transaction data exposure and/or the date/time of the corresponding transaction, and/or total volume in units per item, and/or frequency/liquidity of the transaction data, and/or concentration/fragmentation of the transaction data by source of the transaction data, and/or concentration/fragmentation of the transaction data by the type of transaction.

216. The method of claim 124, wherein calculating the market value for the at least one item in the product specification data set or the price data set includes statistically validating the calculated market value by measuring a deviation of the calculated market value from a prior or base market value, wherein exceeding a pre-defined threshold or value of change from the prior or base market value causes a re-calculation of the market value and/or flagging of the calculated market value as falling outside a pre-defined deviation or value of change.

217. The method of claim 214, wherein the one or more pre-defined rules, variables, or criteria operably associated with the at least one item in the product specification data set or the price data set causes the adjustment value to be applied to the transaction data set with the varying parameter, wherein the adjustment value is calculated for each varying parameter, wherein the adjustment value serves to minimize a difference between the transaction data set with the varying parameter and the average of all responsive transaction data sets over a defined period of time, or an average of a control group of transaction data sets over a defined period of time, wherein the adjustment value is determined by applying a least squares or similar curve-fit algorithm.

218. The method of claim 124, wherein the normalized market price data sets include at least one compound or multi-variant market price data set generated by operably associating the at least one item in the product specification data set, the price data set, a parameter, or a database, with one or more other items, parameters, or databases, and/or conditionally associating the at least one item, the parameter, or the database with one or more other pre-defined rules, variables, or criteria.

219. The method of claim 124, wherein the one or more pre-defined rules, variables, or criteria include:
one or more formulas operationally combining elements and using variables relating to a plurality of items, parameters, and/or databases; and/or a combination of rules, variables, or criteria relating to a plurality of items, parameters, and/or databases, the application of which may be conditional, hierarchical, or priority weighted; and/or validation rules or criteria relating to a plurality of items, parameters, and/or databases, the application of which may be conditional, hierarchical, or priority weighted.

220. The computer-readable storage medium of claim 170, wherein the at least one item identified in the product specification data set or the price data set, or at least one parameter identified in the product specification data set or in the price data set or in an obtained transaction data set, is operably associated with one or more pre-defined rules, variables, or criteria for adapting and managing metric data, wherein such operable association is static and automatically applied or dynamic and conditionally applied.

221. The computer-readable storage medium of claim 170, wherein the rules, variables, or criteria are pre-defined by at least one agent and apply when the at least one agent provides a product specification data set or receives a price data set containing one or more items for market valuation.

222. The computer-readable storage medium of claim 170, wherein at least one responsive transaction data set has one or more parameters that vary from the product specification data set or the price data set, and wherein at least one pre-defined rule, variable, or criteria causes an adjustment value to be calculated and applied to the transaction data in the transaction data set with the one or more varying parameters.

223. The computer-readable storage medium of claim 170, further comprising instructions that cause the one or more computing devices, before calculating the market value for the at least one item in the product specification data set or the price data set, to validate the normalized market reference price data against pre-defined rules and criterion that include the date/time of transaction data exposure and/or the date/time of the corresponding transaction, and/or total volume in units per item, and/or frequency/liquidity of the transaction data, and/or concentration/fragmentation of the transaction data by source of the transaction data, and/or concentration/fragmentation of the transaction data by the type of transaction.

224. The computer-readable storage medium of claim 170, wherein calculating the market value for the at least one item in the product specification data set and/or the price data set includes statistically validating the calculated market value by measuring a deviation of the calculated market value from a prior or base market value, wherein exceeding a pre-defined threshold or value of change from the prior or base market value causes a re-calculation of the market value and/or flagging of the calculated market value as falling outside a pre-defined deviation or value of change.

225. The computer-readable storage medium of claim 222, wherein the one or more pre-defined rules, variables, or criteria operably associated with the at least one item in the product specification data set or the price data set causes the adjustment value to be applied to the transaction data set with the varying parameter, wherein the adjustment value is calculated for each varying parameter, wherein the adjustment value serves to minimize a difference between the transaction data set with the varying parameter and the average of all responsive transaction data sets over a defined period of time, or an average of a control group of transaction data sets over a defined period of time, wherein the adjustment value is determined by applying a least squares or similar curve-fit algorithm.

226. The computer-readable storage medium of claim 170, wherein the normalized market price data sets include at least one compound or multi-variant market price data set generated by operably associating the at least one item in the product specification data set, the price data set, a parameter, or a database, with one or more other items, parameters, or databases, and/or conditionally associating the at least one item, the parameter, or the database with one or more other pre-defined rules, variables, or criteria.

227. The computer-readable storage medium of claim 170, wherein the one or more pre-defined rules, variables, or criteria include:

one or more formulas operationally combining elements and using variables relating to a plurality of items, parameters, and/or databases; and/or a combination of rules, variables, or criteria relating to a plurality of items, parameters, and/or databases, the application of which may be conditional, hierarchical, or priority weighted; and/or validation rules or criteria relating to a plurality of items, parameters, and/or databases, the application of which may be conditional, hierarchical, or priority weighted.

\* \* \* \* \*